(12) United States Patent
Kobayashi

(10) Patent No.: US 12,385,802 B2
(45) Date of Patent: Aug. 12, 2025

(54) MEASUREMENT METHOD, MEASUREMENT DEVICE, MEASUREMENT SYSTEM, AND MEASUREMENT PROGRAM

(71) Applicant: SEIKO EPSON CORPORATION, Tokyo (JP)

(72) Inventor: Yoshihiro Kobayashi, Komagane (JP)

(73) Assignee: SEIKO EPSON CORPORATION (JP)

( * ) Notice: Subject to any disclaimer, the term of this patent is extended or adjusted under 35 U.S.C. 154(b) by 251 days.

(21) Appl. No.: 18/076,485

(22) Filed: Dec. 7, 2022

(65) Prior Publication Data

US 2023/0175918 A1    Jun. 8, 2023

(30) Foreign Application Priority Data

Dec. 8, 2021   (JP) .................. 2021-199212

(51) Int. Cl.
G01M 5/00        (2006.01)

(52) U.S. Cl.
CPC ........ G01M 5/0066 (2013.01); G01M 5/0008 (2013.01)

(58) Field of Classification Search
None
See application file for complete search history.

(56) References Cited

U.S. PATENT DOCUMENTS

| | | | | |
|---|---|---|---|---|
| 4,901,575 A | * | 2/1990 | Bohannan | G01M 5/0008 73/594 |
| 2006/0042396 A1 | * | 3/2006 | Qing | G01L 1/162 702/42 |
| 2010/0271199 A1 | * | 10/2010 | Belov | G01M 5/00 340/539.3 |
| 2011/0130915 A1 | | 6/2011 | Wright et al. | |
| 2016/0084961 A1 | * | 3/2016 | Morishita | G01M 5/0066 342/357.52 |

FOREIGN PATENT DOCUMENTS

JP      2019-049095 A      3/2019

* cited by examiner

*Primary Examiner* — Huy Q Phan
*Assistant Examiner* — Carl F. R. Tchatchouang
(74) *Attorney, Agent, or Firm* — Harness, Dickey & Pierce, P.L.C.

(57) ABSTRACT

A measurement method includes: an acceleration data acquisition step of acquiring acceleration data output from an accelerometer that observes an observation point of a structure when a first moving body moves on the structure; a speed vibration component calculation step of calculating a first speed vibration component by performing integration processing and filter processing on an acceleration based on the acceleration data; and a displacement amplitude estimation step of estimating, based on the first speed vibration component and a conversion function calculated in advance based on displacement data output from a displacement meter that observes the observation point when a second moving body moves on the structure, a displacement amplitude of the structure when the first moving body moves on the structure.

7 Claims, 16 Drawing Sheets

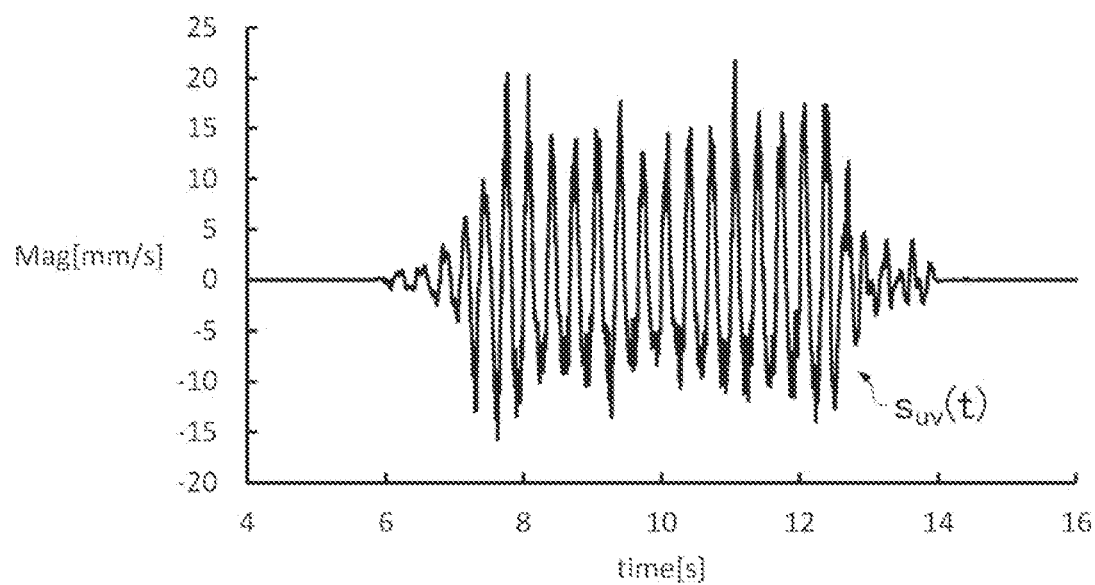
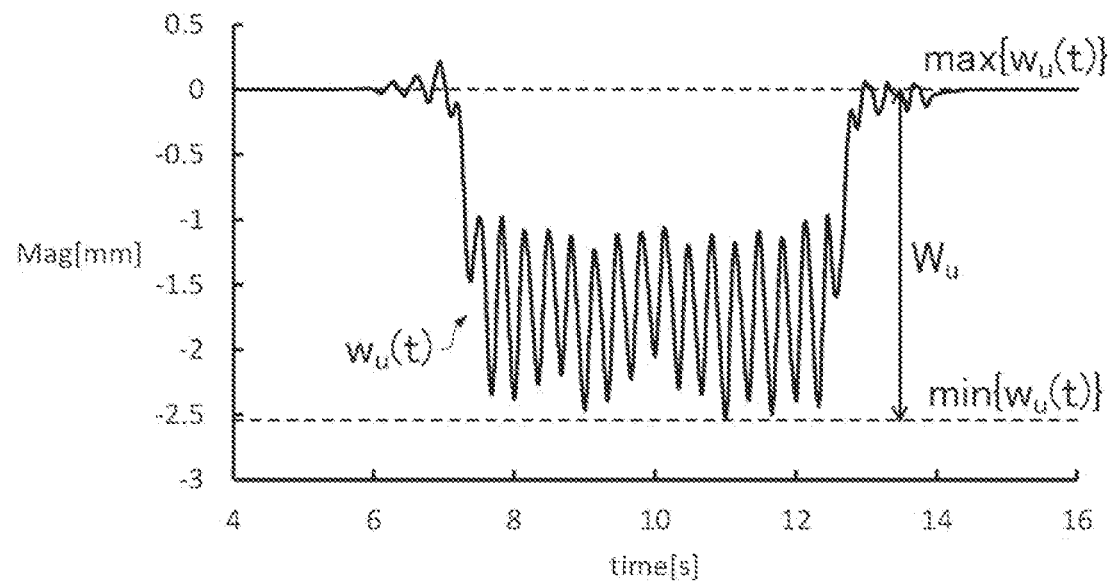

MEASUREMENT METHOD, MEASUREMENT DEVICE, MEASUREMENT SYSTEM, AND MEASUREMENT PROGRAM

The present application is based on, and claims priority from JP Application Serial Number 2021-199212, filed Dec. 8, 2021, the disclosure of which is hereby incorporated by reference herein in its entirety.

BACKGROUND

1. Technical Field

The present disclosure relates to a measurement method, a measurement device, a measurement system, and a measurement program.

2. Related Art

JP-A-2019-49095 discloses an acceleration sensor mounted on a railway bridge, and a deflection measurement device that sets an output of the acceleration sensor when the railway bridge is in an unloaded state as a zero point of an acceleration, corrects the zero point of the acceleration output by the acceleration sensor when the railway bridge is in a loaded state, and estimates, after the zero point correction, a deflection amount of the railway bridge by preventing drift by applying twice integration, Bayesian estimation, a Kalman filter, or the like.

However, in FIG. 3C in JP-A-2019-49095, displacement in a section in which the railway bridge is in the loaded state is increased more than in a section in which the railway bridge is in the unloaded state. However, it is obvious that an expected displacement waveform is a waveform in which the displacement in the section in which the railway bridge is in the loaded state is decreased more than in the section in which the railway bridge is in the unloaded state. This is similar to a result of reducing a signal component in a low frequency range of the displacement waveform together with a drift component in the low frequency range. Therefore, in a method of estimating a deflection amount by the deflection measurement device disclosed in JP-A-2019-49095, the drift and the component in the low frequency range of the displacement waveform are also reduced. Therefore, there is a possibility that an original displacement amplitude cannot be accurately estimated.

SUMMARY

According to an aspect of the present disclosure, a measurement method includes: an acceleration data acquisition step of acquiring acceleration data output from an accelerometer that observes an observation point of a structure when a first moving body moves on the structure; a speed vibration component calculation step of calculating a first speed vibration component by performing integration processing and filter processing on an acceleration based on the acceleration data; and a displacement amplitude estimation step of estimating, based on the first speed vibration component and a conversion function calculated in advance based on displacement data output from a displacement meter that observes the observation point when a second moving body moves on the structure, a displacement amplitude of the structure when the first moving body moves on the structure.

According to an aspect of the present disclosure, a measurement device includes: an acceleration data acquisition unit configured to acquire acceleration data output from an accelerometer that observes an observation point of a structure when a first moving body moves on the structure; a speed vibration component calculation unit configured to calculate a first speed vibration component by performing integration processing and filter processing on an acceleration based on the acceleration data; and a displacement amplitude estimation unit configured to estimate, based on the first speed vibration component and a conversion function calculated in advance based on displacement data output from a displacement meter that observes the observation point when a second moving body moves on the structure, a displacement amplitude of the structure when the first moving body moves on the structure.

According to an aspect of the present disclosure, a measurement system includes: the measurement device according to the above aspect; and the accelerometer.

According to an aspect of the present disclosure, a non-transitory computer-readable storage medium stores a measurement program, the measurement program causing a computer to execute: an acceleration data acquisition step of acquiring acceleration data output from an accelerometer that observes an observation point of a structure when a first moving body moves on the structure; a speed vibration component calculation step of calculating a first speed vibration component by performing integration processing and filter processing on an acceleration based on the acceleration data; and a displacement amplitude estimation step of estimating, based on the first speed vibration component and a conversion function calculated in advance based on displacement data output from a displacement meter that observes the observation point when a second moving body moves on the structure, a displacement amplitude of the structure when the first moving body moves on the structure.

BRIEF DESCRIPTION OF THE DRAWINGS

FIG. 8 is a diagram showing an example of a speed vibration component $s_{uv}(t)$.

FIG. 9 is a diagram showing an example of a displacement amplitude $W_u$.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. Not all configurations to be described below are necessarily essential components of the present disclosure.

1. First Embodiment 1-1. Configuration of Measurement System

A moving body passing through a superstructure of a bridge that is a structure according to the present embodiment is a vehicle, a railway vehicle, or the like that has a large weight and can be measured by BWIM. The BWIM is an abbreviation of bridge weigh in motion, and is a technology in which a bridge is regarded as a scale, deformation of the bridge is measured, and whereby the weight and the number of axles of the moving body passing through the bridge is measured. The superstructure of the bridge, which enables analysis of the weight of the moving body passing through the bridge, based on a response such as deformation or strain, is a structure in which the BWIM functions. The BWIM system, which applies a physical process between an action on the superstructure of the bridge and the response, enables the measurement of the weight of the moving body that travels on the bridge. Hereinafter, a measurement system for implementing a measurement method according to the present embodiment will be described by taking a case where the moving body is a railway vehicle as an example.

Figure 1:
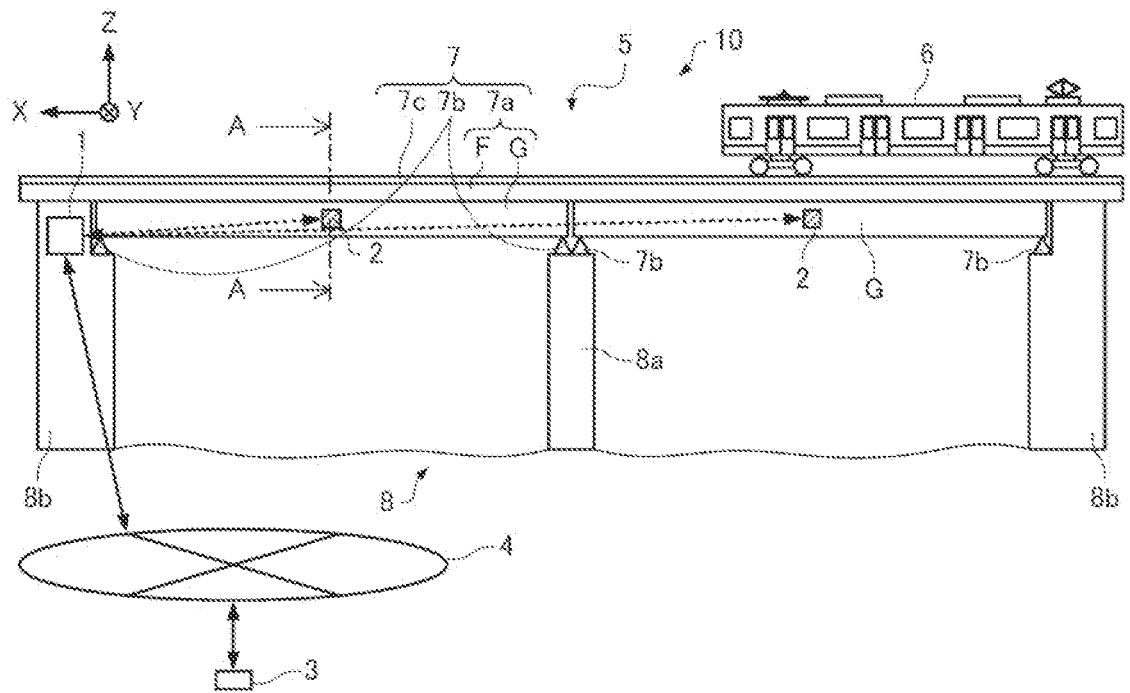
FIG. 1 is a diagram showing a configuration example of a measurement system.

FIG. 1 is a diagram showing an example of the measurement system according to the present embodiment. As show in FIG. 1, a measurement system 10 according to the present embodiment includes a measurement device 1 and at least one accelerometer 2 provided in a superstructure 7 of a bridge 5. The measurement system 10 may include a monitoring device 3. The measurement system 10 may include a displacement meter 9 to be described later.

Figure 2:
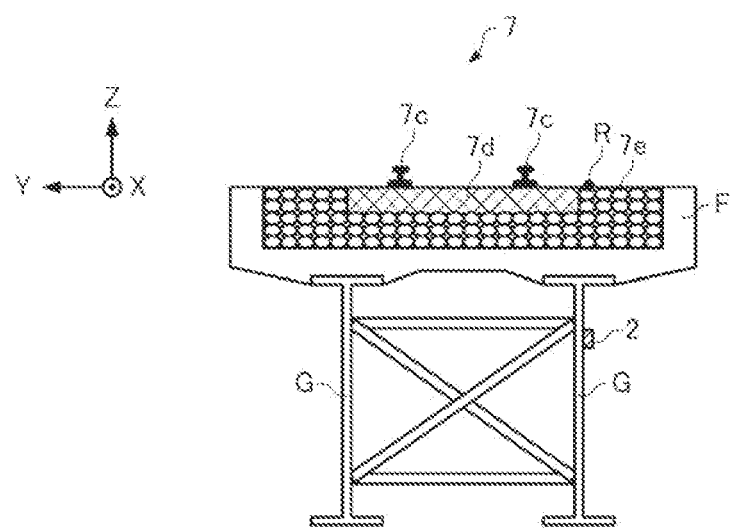
FIG. 2 is a cross-sectional view of a superstructure in FIG. 1 taken along line A-A.

The bridge 5 includes the superstructure 7 and a substructure 8. FIG. 2 is a cross-sectional view of the superstructure 7 taken along line A-A in FIG. 1. As shown in FIGS. 1 and 2, the superstructure 7 includes a bridge floor 7a including a floor plate F, a main girder G, a cross girder, which is not shown, and the like, bearings 7b, rails 7c, a tie 7d, and a ballast 7e. As shown in FIG. 1, the substructure 8 includes bridge piers 8a and bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

When a railway vehicle 6 enters the superstructure 7, the superstructure 7 is bent due to a load of the railway vehicle 6. Since the railway vehicle 6 includes a plurality of vehicles coupled to each other, the bending of the superstructure 7 is periodically repeated as the vehicles pass through the superstructure 7. On the other hand, since the superstructure 7 has a natural vibration frequency as a structure, natural vibration of the superstructure 7 may be excited when the railway vehicle 6 passes through the superstructure 7. When the natural vibration of the superstructure 7 is excited, the bending of the superstructure 7 is periodically repeated.

The measurement device 1 and the accelerometers 2 are coupled by, for example, a cable which is not shown and communicate with one another via a communication network such as CAN. CAN is an abbreviation for controller area network. Alternatively, the measurement device 1 and the accelerometers 2 may communicate with one another via a wireless network.

Each accelerometer 2 outputs acceleration data used to estimate a displacement amplitude due to the bending of the superstructure 7 when the railway vehicle 6, which is a moving body, moves on the superstructure 7, which is a structure. The accelerometer 2 may be, for example, an accelerometer using a crystal acceleration sensor or an accelerometer using a MEMS sensor. MEMS is an abbreviation for micro electro mechanical systems.

In the present embodiment, each accelerometer 2 is installed at a central portion of the superstructure 7 in a longitudinal direction, specifically, at a central portion of the main girder G in the longitudinal direction. However, each accelerometer 2 only needs to be able to detect an acceleration for estimating the displacement amplitude of the superstructure 7, and an installation position thereof is not limited to the central portion of the superstructure 7. When each accelerometer 2 is provided on the floor plate F of the superstructure 7, the accelerometer 2 may be damaged due to traveling of the railway vehicle 6. Since the measurement accuracy may be affected by local deformation of the bridge floor 7a, in the examples of FIGS. 1 and 2, each accelerometer 2 is provided at the main girder G of the superstructure 7.

The floor plate F, the main girder G, and the like of the superstructure 7 are bent in a vertical direction due to a load of the railway vehicle 6 passing through the superstructure 7. Each accelerometer 2 detects an acceleration of the bending of the floor plate F or the main girder G caused by the load of the railway vehicle 6 passing through the superstructure 7.

The measurement device 1 estimates, based on the acceleration data output from each accelerometer 2, the displacement amplitude of the superstructure 7 when the railway vehicle 6 passes through the superstructure 7. The measurement device 1 is installed on, for example, the bridge abutment 8b.

The measurement device 1 and the monitoring device 3 can communicate with each other via, for example, a wireless network of a mobile phone and a communication network 4 such as the Internet. The measurement device 1 transmits, to the monitoring device 3, measurement data including the displacement amplitude of the superstructure 7 when the railway vehicle 6 passes through the superstructure 7. The monitoring device 3 may store the information in a storage device which is not shown, and may perform, based on the information, processing such as monitoring of the railway vehicle 6 or determination of an abnormality in the superstructure 7.

In the present embodiment, the bridge 5 is a railroad bridge, and is, for example, a steel bridge, a girder bridge, or an RC bridge. RC is an abbreviation for reinforced-concrete.

As shown in FIG. 2, in the present embodiment, an observation point R is set in association with the accelerometer 2. In the example of FIG. 2, the observation point R is set at a position on a surface of the superstructure 7 in a vertically upward direction of the accelerometer 2 provided at the main girder G. That is, the accelerometer 2 is an observation device that observes the observation point R. The accelerometer 2 detects an acceleration which is a response to an action of a plurality of parts of the railway vehicle 6 moving on the superstructure 7, which is a structure, on the observation point R, and outputs data including the detected acceleration. For example, each of the plurality of parts of the railway vehicle 6 is an axle or a wheel, and is hereinafter assumed to be an axle. The accelerometer 2 may be provided at a position where the acceleration generated at the observation point R due to the traveling of the railway vehicle 6 can be detected. The accelerometer 2 is preferably provided at a position close to the observation point R in the vertical direction.

The number and installation positions of the accelerometers 2 are not limited to the examples shown in FIGS. 1 and 2, and various modifications can be made.

The measurement device 1 acquires, based on the acceleration data output from the accelerometer 2, an acceleration in a direction intersecting a surface of the superstructure 7 on which the railway vehicle 6 moves. The surface of the superstructure 7 on which the railway vehicle 6 moves is defined by a direction along which the railway vehicle 6 moves, that is, an X direction which is the longitudinal direction of the superstructure 7, and a direction orthogonal to the direction along which the railway vehicle 6 moves, that is, a Y direction which is a width direction of the superstructure 7. Since the observation point R is bent in a direction orthogonal to the X direction and the Y direction due to the traveling of the railway vehicle 6, the measurement device 1 preferably acquires the acceleration in a direction orthogonal to the X direction and the Y direction, that is, a Z direction which is a normal direction of the floor plate F, in order to accurately calculate a magnitude of the acceleration of the bending.

Figure 3:
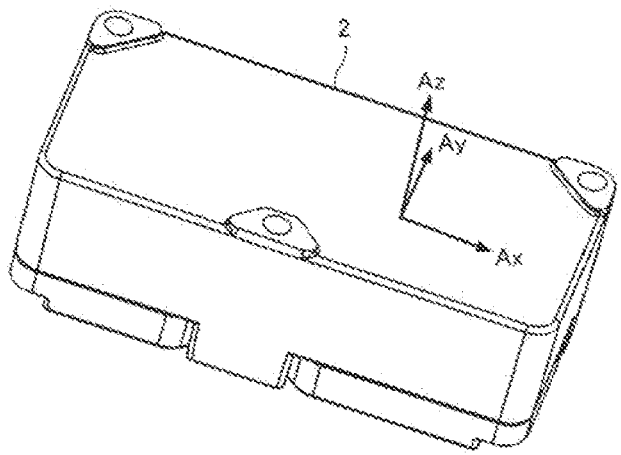
FIG. 3 is an explanatory diagram of an acceleration detected by an acceleration sensor.

FIG. 3 is a diagram showing the acceleration detected by the accelerometer 2. The accelerometer 2 detects accelerations generated in respective axial directions of three axes orthogonal to one another.

In order to detect the acceleration of the bending at the observation point R caused by the traveling of the railway vehicle 6, the accelerometer 2 is installed such that one of three detection axes, which are an x axis, a y axis, and a z axis, is in a direction intersecting the X direction and the Y direction. In FIGS. 1 and 2, the accelerometers 2 are installed such that one axis thereof is in the direction intersecting the X direction and the Y direction. The observation point R is bent in the direction orthogonal to the X direction and the Y direction. Therefore, in order to accurately detect the acceleration of the bending, ideally, the accelerometers 2 are installed such that one axis thereof is aligned with the Z direction orthogonal to the X direction and the Y direction, that is, the normal direction of the floor plate F.

However, when the accelerometer 2 is installed on the superstructure 7, an installation location may be inclined. In the measurement device 1, even if one of the three detection axes of the accelerometer 2 is installed so as not to be aligned with the normal direction of the floor plate F, since the one axis is substantially oriented in the normal direction, an error is small and thus can be ignored. The measurement device 1 can correct a detection error due to inclination of the accelerometer 2 based on a three-axis combined acceleration obtained by combining the accelerations in the x axis, the y axis, and the z axis even if one of the three detection axes of the accelerometer 2 is installed so as not to be aligned with the normal direction of the floor plate F. The accelerometer 2 may further be a uniaxial accelerometer that detects an acceleration generated at least in a direction substantially parallel to the vertical direction or an acceleration in the normal direction of the floor plate F.

In the present embodiment, the measurement device 1 estimates, based on the acceleration data output from the accelerometer 2 when the railway vehicle 6 passes through the superstructure 7 and a conversion function $f_{conv}$ calculated in advance, the displacement amplitude of the superstructure 7 when the railway vehicle 6 passes through the superstructure 7. The conversion function $f_{conv}$ is a function representing a relationship between the displacement amplitude of the superstructure 7 and an amplitude of a speed vibration component, and is calculated in advance based on displacement data output from the displacement meter 9 that observes the observation point R. For example, the displacement meter 9 is installed before the accelerometer 2 is installed. The measurement device 1 calculates the conversion function $f_{conv}$ based on the displacement data output from the displacement meter 9 when a railway vehicle 6A passes through the superstructure 7, and stores each coefficient value of the calculated conversion function $f_{conv}$ in a storage unit which is not shown. The railway vehicle 6A may be the same railway vehicle as the railway vehicle 6 or may be a railway vehicle different from the railway vehicle 6. Then, after the displacement meter 9 is removed, the accelerometer 2 is installed in the superstructure 7. The measurement device 1 estimates the displacement amplitude of the superstructure 7 based on the acceleration data output from the accelerometer 2 when the railway vehicle 6 passes through the superstructure 7 and the conversion function $f_{conv}$ stored in the storage unit.

Figure 4:
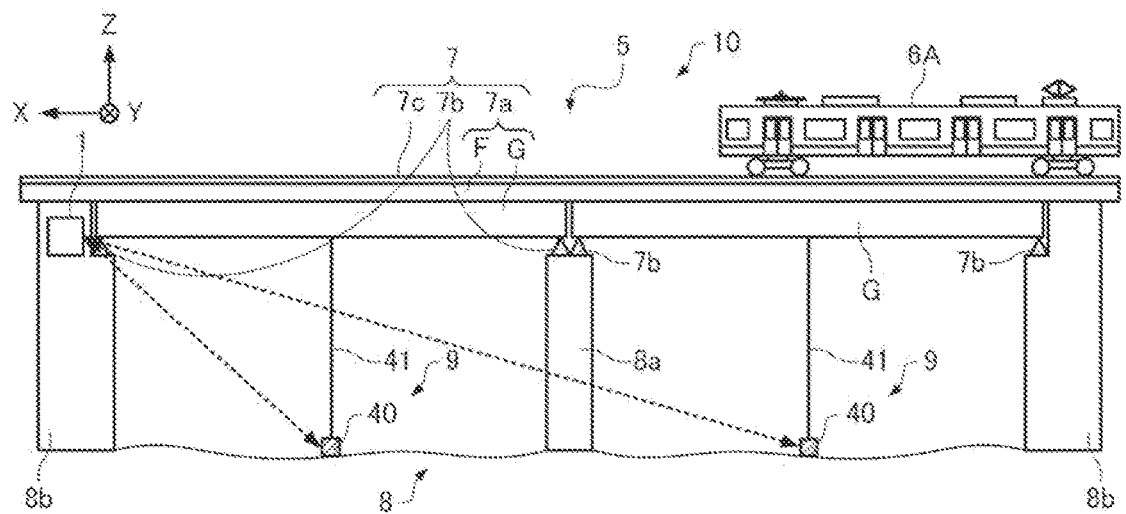
FIG. 4 is a diagram showing an installation example of a displacement meter.
Figure 5:
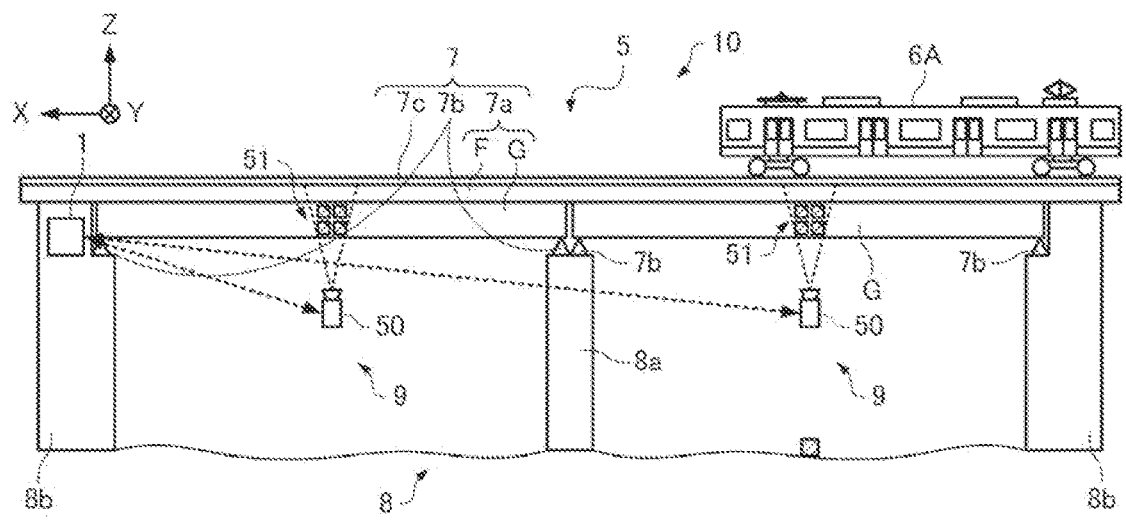
FIG. 5 is a diagram showing another installation example of the displacement meter.

The displacement meter 9 installed to calculate the conversion function $f_{conv}$ may be, for example, a ring type displacement meter, a laser displacement meter, an image measurement device, or a load cell. FIG. 4 shows an example in which a ring type displacement meter is used as the displacement meter 9. FIG. 5 shows an example in which an image measurement device is used as the displacement meter 9. In FIGS. 4 and 5, the same components as those in FIG. 1 are denoted by the same reference numerals, and description thereof is omitted. In the example of FIG. 4, a piano wire 41 is fixed between an upper surface of a ring type displacement meter 40 and a lower surface of the main girder G immediately above the ring type displacement meter 40. The ring type displacement meter 40 measures a displacement of the piano wire 41 caused by the bending of the superstructure 7 and transmits the measured displacement data to the measurement device 1. The measurement device 1 calculates the conversion function $f_{conv}$ based on the displacement data transmitted from the ring type displacement meter 40. In the example of FIG. 5, a camera 50 transmits, to the measurement device 1, an image obtained by imaging a target 51 provided on a side surface of the main girder G. The measurement device 1 processes the image transmitted from the camera 50, generates displacement data by calculating the displacement of the target 51 due to the bending of the superstructure 7, and calculates the conversion function $f_{conv}$ based on the generated displacement data. In the example of FIG. 5, the measurement device 1 generates the displacement data as an image measurement device, whereas an image measurement device, which is not shown, different from the measurement device 1 may generate the displacement data by image processing.

Hereinafter, details of the measurement method according to the present embodiment executed by the measurement system 10 will be described.

1-2. Details of Measurement Method

Figure 6:
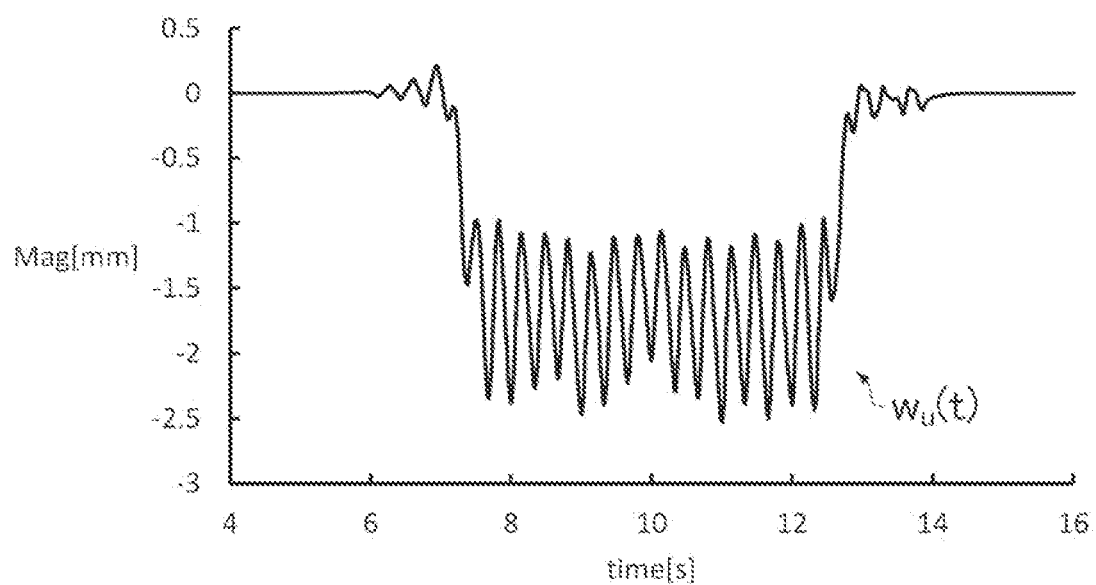
FIG. 6 is a diagram showing an example of a displacement $w_u(t)$.
Figure 7:
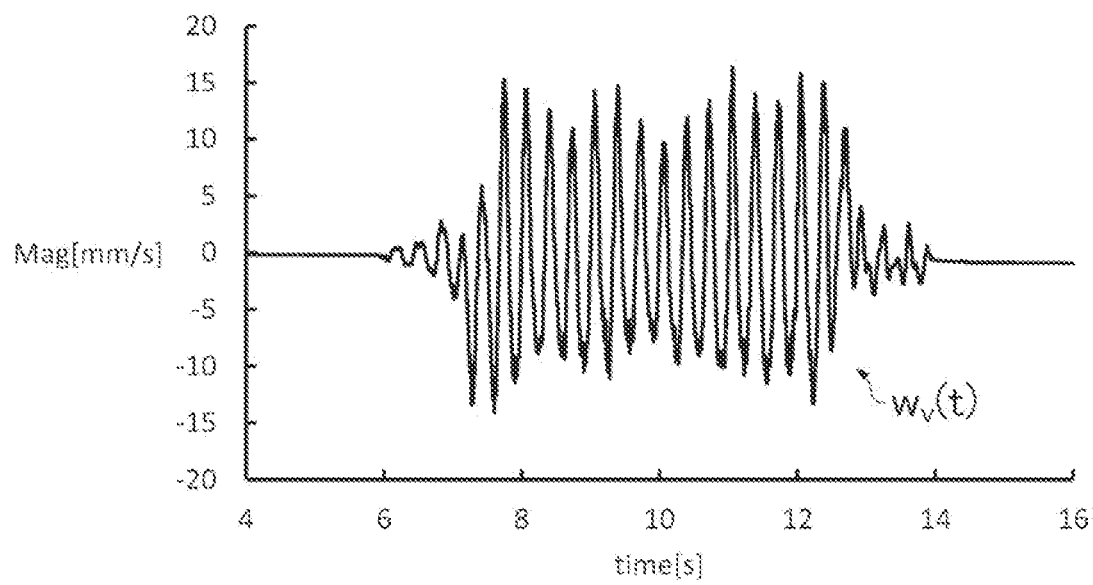
FIG. 7 is a diagram showing an example of a speed $w_v(t)$.

First, in order to calculate the conversion function $f_{conv}$, the measurement device 1 acquires displacement data output from the displacement meter 9 when the railway vehicle 6A passes through the superstructure 7 of the bridge 5, and calculates a speed $w_v(t)$ by differentiating a displacement $w_u(t)$ based on the displacement data, as in Equation (1). FIG. 6 shows an example of the displacement $w_u(t)$. FIG. 7 shows an example of the speed $w_v(t)$ obtained by differentiating the displacement $w_u(t)$ in FIG. 6.

$$w_v(t) = \frac{d}{dt} w_u(t) \tag{1}$$

Next, the measurement device 1 calculates a speed vibration component $s_{uv}(t)$ by performing high-pass filter processing on the speed $w_v(t)$, as in Equation (2).

$$s_{uv}(t) = f_{HPF}(w_v(t)) \tag{2}$$

The high-pass filter processing in Equation (2) is performed as in Equation (3), for example, with a moving average interval being set from $t-t_p$ to $t+t_p$. A time $t_p$ in Equation (3) is obtained by Equation (4) by converting $T/2\Delta T$ into an integer by a floor function, where T is a vibration period of the displacement $w_u(t)$ and $\Delta T$ is data time resolution. FIG. 8 shows an example of the speed vibration component $s_{uv}(t)$ obtained by performing the high-pass filter processing on the speed $w_v(t)$ in FIG. 7. The measurement device 1 may calculate the speed vibration component $s_{uv}(t)$ by performing band-pass filter processing on the speed $w_v(t)$.

$$s_{uv}(t) = w_v(t) - \sum_{k=t-t_p}^{t+t_p} w_v(k) \tag{3}$$

$$t_p = \left(\left\lfloor \frac{T}{2\Delta T} \right\rfloor + 1\right) \times \Delta T \tag{4}$$

Next, the measurement device 1 calculates a difference between a maximum value $\max\{w_u(t)\}$ and a minimum value $\min\{w_u(t)\}$ of the displacement $w_u(t)$ as the displacement amplitude $W_u$, as in Equation (5). FIG. 9 shows an example of the displacement amplitude $W_u$ calculated from the displacement $w_u(t)$ in FIG. 6. As shown in FIG. 9, a vibration waveform of the displacement $w_u(t)$ before the railway vehicle 6A enters the superstructure 7 and after the railway vehicle 6A exits the superstructure 7 is a waveform affected by vibration when the railway vehicle 6A passes through another superstructure 7 adjacent to the superstructure 7, and is not a displacement waveform due to the load of the railway vehicle 6A. Therefore, to remove the influence, the maximum value $\max\{w_u(t)\}$ is usually set to 0.

$$W_u = \max\{w_u(t)\} - \min\{w_u(t)\} \tag{5}$$

Figure 10:
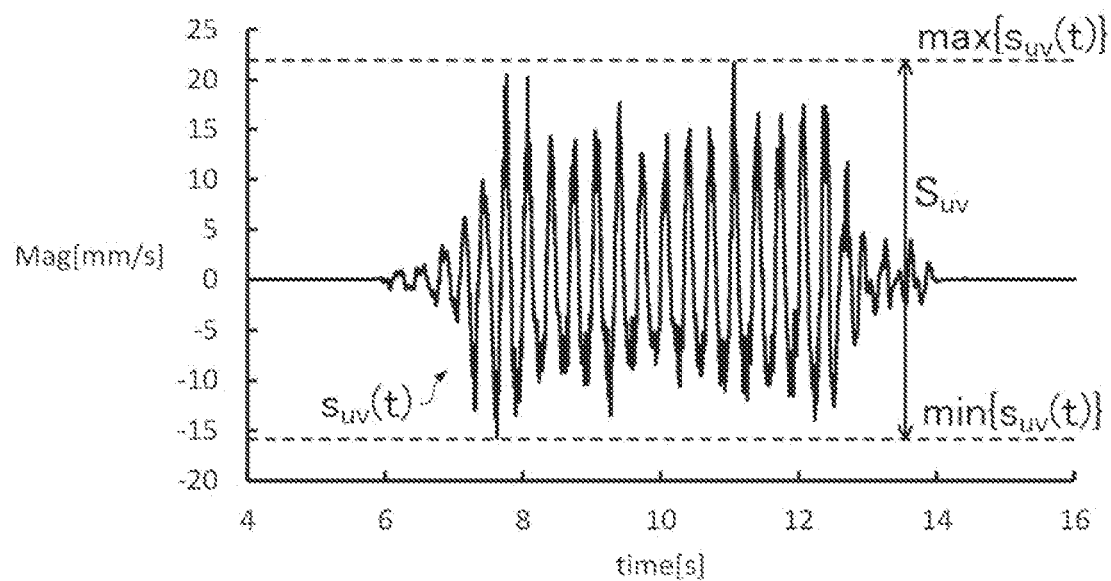
FIG. 10 is a diagram showing an example of a speed amplitude $S_{uv}$.

The measurement device 1 calculates the difference between a maximum value $\max\{s_{uv}(t)\}$ and a minimum value $\min\{s_{uv}(t)\}$ of the speed vibration component $s_{uv}(t)$ as a speed amplitude $S_{uv}$, as in Equation (6). FIG. 10 shows an example of the speed amplitude $S_{uv}$ calculated from the speed vibration component $s_{uv}(t)$ in FIG. 8.

$$S_{uv} = \max\{s_{uv}(t)\} - \min\{s_{uv}(t)\} \tag{6}$$

Then, the measurement device 1 calculates the conversion function $f_{conv}$ using the displacement amplitude $W_u$ and the speed amplitude $S_{uv}$. For example, the measurement device 1 calculates a ratio between the displacement amplitude $W_u$ and the speed amplitude $S_{uv}$ as a linear coefficient $R_{uv}$ of the conversion function $f_{conv}$ by using the conversion function $f_{conv}$ as a linear function and using Equation (7). For example, it is assumed that a zero-order coefficient of the conversion function $f_{conv}$ is 0.

$$R_{uv} = \frac{W_u}{S_{uv}} \tag{7}$$

Here, the measurement by the displacement meter 9 and the calculation of the conversion function $f_{conv}$ are completed. The displacement meter 9 that is temporarily installed is removed. Further, the accelerometer 2 is installed on the superstructure 7 of the bridge 5, and the accelerometer 2 detects the acceleration when the railway vehicle 6 passes through the superstructure 7.

Figure 11:
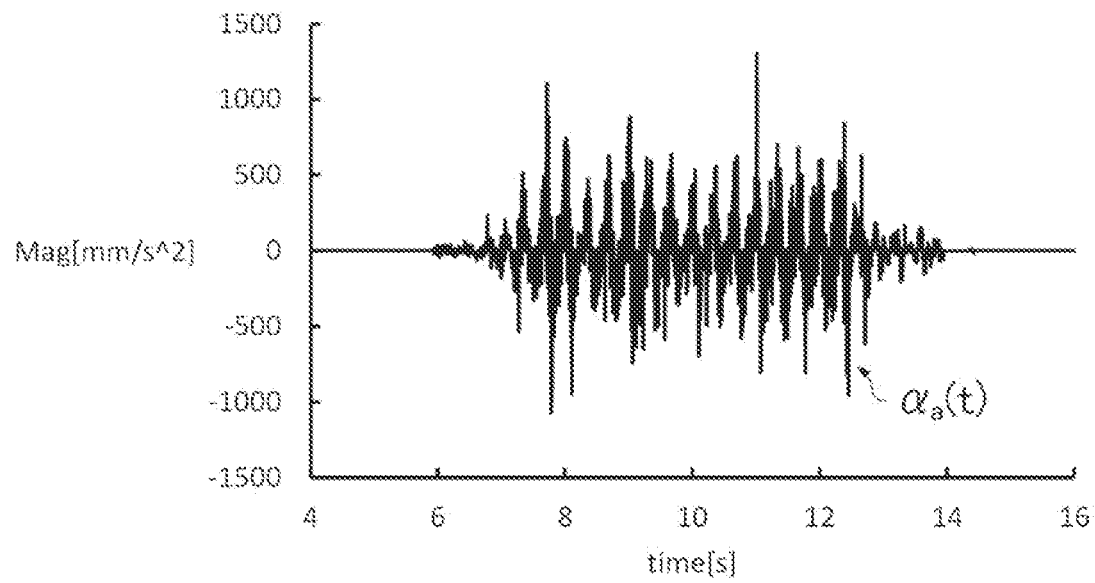
FIG. 11 is a diagram showing an example of an acceleration $\alpha_a(t)$.
Figure 12:
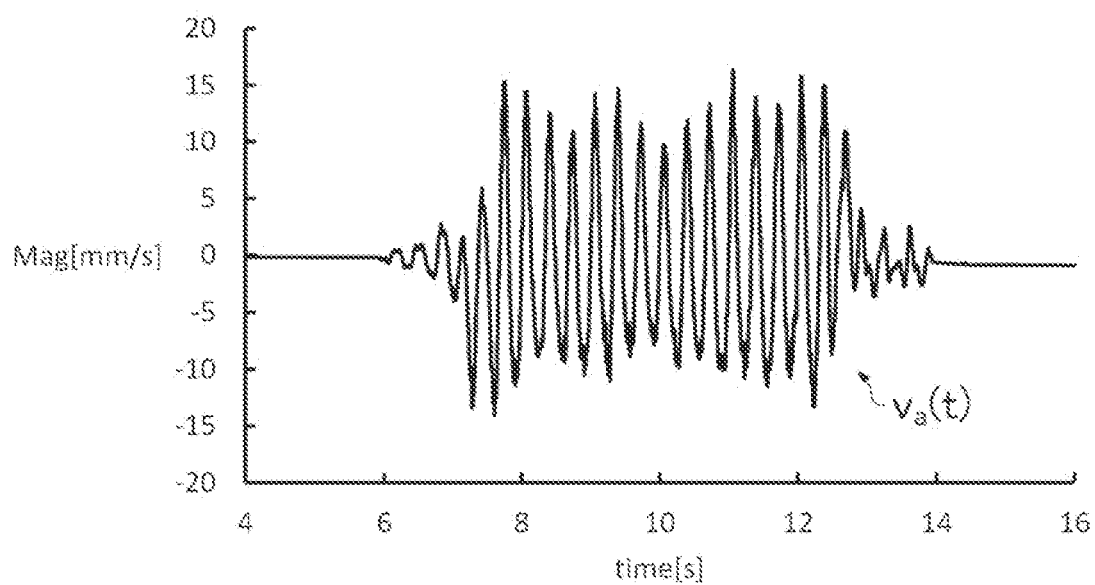
FIG. 12 is a diagram showing an example of an integral speed $v_a(t)$.

First, the measurement device 1 acquires acceleration data output from the accelerometer 2, and integrates an acceleration $\alpha_a(t)$ based on the acceleration data to calculate an integral speed $v_a(t)$. The measurement device 1 sets a time point at a time point t=0 as a bias correction time point, and integrates the subsequent acceleration $\alpha_a(t)$ to calculate the integral speed $v_a(t)$, as in Equation (8). FIG. 11 shows an example of the acceleration $\alpha_a(t)$. FIG. 12 shows an example of the integral speed $v_a(t)$ calculated by integrating the acceleration $\alpha_a(t)$ in FIG. 11.

$$v_a(t) = \int_0^t \{\alpha_a(t) - \alpha_a(0)\} dt \tag{8}$$

Next, the measurement device 1 performs the high-pass filter processing on the integral speed $v_a(t)$ to calculate a speed vibration component $s_{av}(t)$, as in Equation (9). The measurement device 1 may calculate the speed vibration component $s_{av}(t)$ by performing the band-pass filter processing on the integral speed $v_a(t)$.

$$s_{av}(t) = f_{HPF}(v_a(t)) \qquad (9)$$

Figure 13:
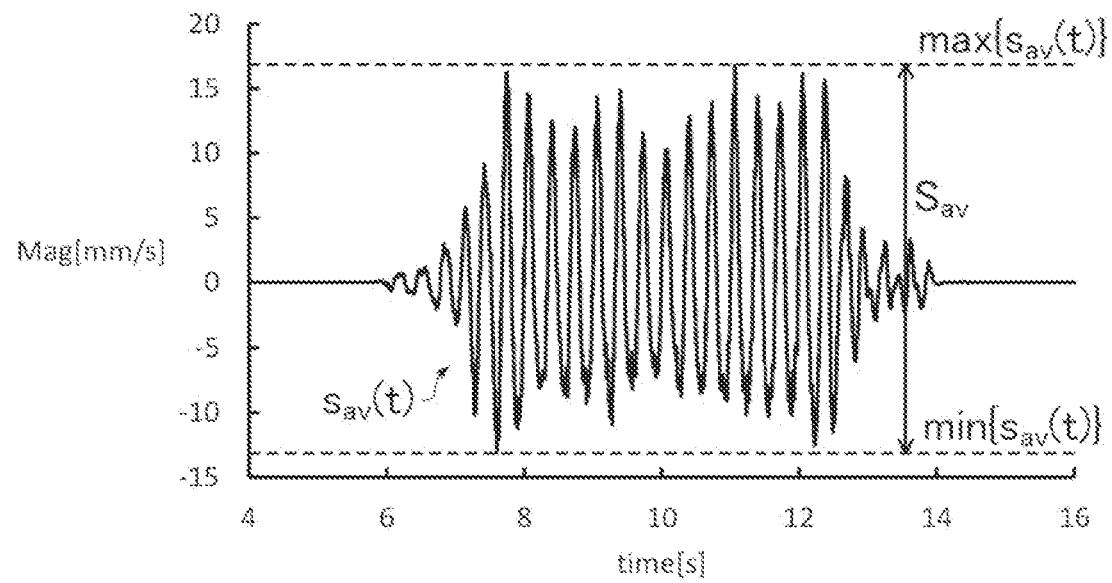
FIG. 13 is a diagram showing an example of a speed vibration component $s_{av}(t)$ and a speed amplitude $S_{av}$.

Next, the measurement device 1 calculates a difference between a maximum value $\max\{s_{av}(t)\}$ and a minimum value $\min\{s_{av}(t)\}$ of the speed vibration component $s_{av}(t)$ as a speed amplitude $S_{av}$, as in Equation (10). FIG. 13 shows an example of the speed vibration component $s_{av}(t)$ obtained by performing the high-pass filter processing on the integral speed $v_a(t)$ in FIG. 12 and the speed amplitude $S_{av}$ calculated based on the speed vibration component $s_{av}(t)$.

$$S_{av} = \max\{s_{av}(t)\} - \min\{s_{av}(t)\} \qquad (10)$$

Then, the measurement device 1 estimates a displacement amplitude $w_{est}$ of the superstructure 7 when the railway vehicle 6 passes through the superstructure 7 of the bridge 5 by using the speed amplitude $S_{av}$ and the conversion function $f_{conv}$, as in Equation (11).

$$w_{est} = f_{conv}(S_{av}) = R_{uv} S_{av} \qquad (11)$$

1-3. Procedure of Measurement Method

Figure 14:
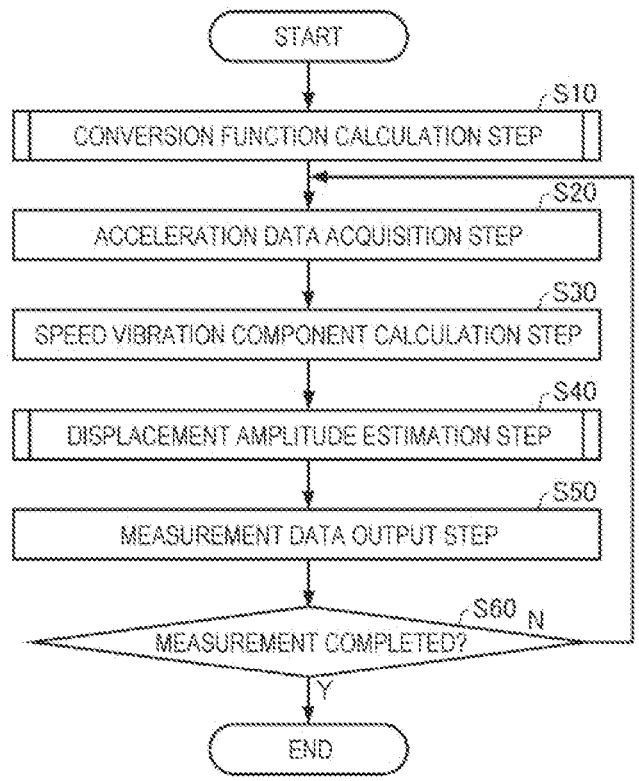
FIG. 14 is a flowchart showing an example of a procedure of a measurement method according to a first embodiment.

FIG. 14 is a flowchart showing an example of a procedure of a measurement method according to a first embodiment. In the present embodiment, the measurement device 1 of the measurement system 10 executes a procedure shown in FIG. 14.

As shown in FIG. 14, first, in a state where the displacement meter 9 that observes the observation point R is installed, in a conversion function calculation step S10, the measurement device 1 calculates the conversion function $f_{conv}$ based on the displacement data output from the displacement meter 9 when the railway vehicle 6A moves on the superstructure 7 of the bridge 5. The railway vehicle 6A is an example of a second moving body. An example of the procedure of the conversion function calculation step S10 will be described later.

Next, in a state where the displacement meter 9 is removed and the accelerometer 2 that observes the observation point R is installed, in an acceleration data acquisition step S20, the measurement device 1 acquires the acceleration data output from the accelerometer 2 when the railway vehicle 6 moves on the superstructure 7 of the bridge 5. The railway vehicle 6 is an example of a first moving body.

Next, in a speed vibration component calculation step S30, the measurement device 1 calculates, based on the acceleration data acquired in the step S20, the speed vibration component $s_{av}(t)$ by performing integration processing and filter processing on the acceleration $\alpha_a(t)$, as in the previously described Equations (8) and (9). For example, the filter processing may be high-pass filter processing or band-pass filter processing. The speed vibration component $s_{av}(t)$ is an example of a first speed vibration component.

Next, in a displacement amplitude estimation step S40, the measurement device 1 estimates, based on the speed vibration component $s_{av}(t)$ calculated in the step S30 and the conversion function $f_{conv}$ calculated in advance in the step S10, as in the previously described Equations (10) and (11), the displacement amplitude $w_{est}$, which is the displacement amplitude of the superstructure 7 when the railway vehicle 6 moves on the superstructure 7 of the bridge 5. An example of the procedure of the displacement amplitude estimation step S40 will be described later.

Next, in a measurement data output step S50, the measurement device 1 outputs the measurement data including the displacement amplitude $w_{est}$ calculated in the step S40 to the monitoring device 3. Specifically, the measurement device 1 transmits the measurement data to the monitoring device 3 via the communication network 4. The measurement data may include the speed vibration component $s_{av}(t)$, the speed amplitude $S_{av}$, and the like in addition to the displacement amplitude $w_{est}$.

Then, the measurement device 1 repeatedly performs processing from steps S20 to S50 until the measurement is completed in step S60.

Figure 15:
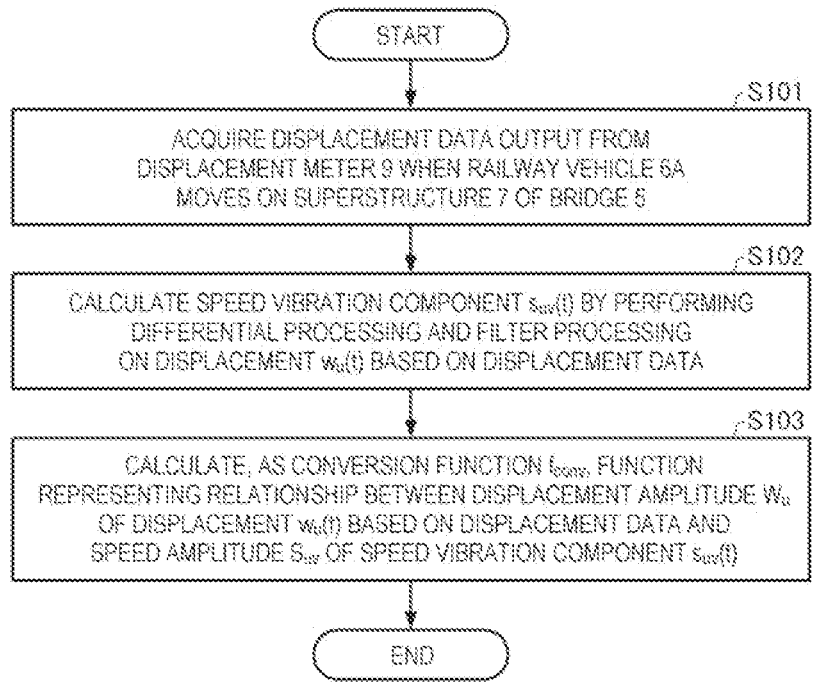
FIG. 15 is a flowchart showing an example of a procedure of a conversion function calculation step in the first embodiment.

FIG. 15 is a flowchart showing an example of the procedure of the conversion function calculation step S10 in FIG. 14.

As shown in FIG. 15, first, in step S101, the measurement device 1 acquires displacement data output from the displacement meter 9 when the railway vehicle 6A moves on the superstructure 7 of the bridge 5.

Next, in step S102, the measurement device 1 calculates the speed vibration component $s_{uv}(t)$ by performing the differential processing and the filter processing on the displacement $w_u(t)$ based on the displacement data acquired in step S101, as in the previously described Equations (1) and (2). The speed vibration component $s_{uv}(t)$ is an example of a second speed vibration component.

Finally, in step S103, the measurement device 1 calculates, as the conversion function $f_{conv}$, a function representing the relationship between the displacement amplitude $W_u$, which is the amplitude of the displacement $w_u(t)$ based on the displacement data acquired in step S101, and the speed amplitude $S_{uv}$, which is the amplitude of the speed vibration component $s_{uv}(t)$ calculated in step S102, as in the previously described Equations (5), (6), and (7). The displacement amplitude $W_u$ is a difference between the maximum value $\max\{w_u(t)\}$ and the minimum value $\min\{w_u(t)\}$ of the displacement $w_u(t)$. The speed amplitude $S_{uv}$ is a difference between the maximum value $\max\{s_{uv}(t)\}$ and the minimum value $\min\{s_{uv}(t)\}$ of the speed vibration component $s_{uv}(t)$.

Figure 16:
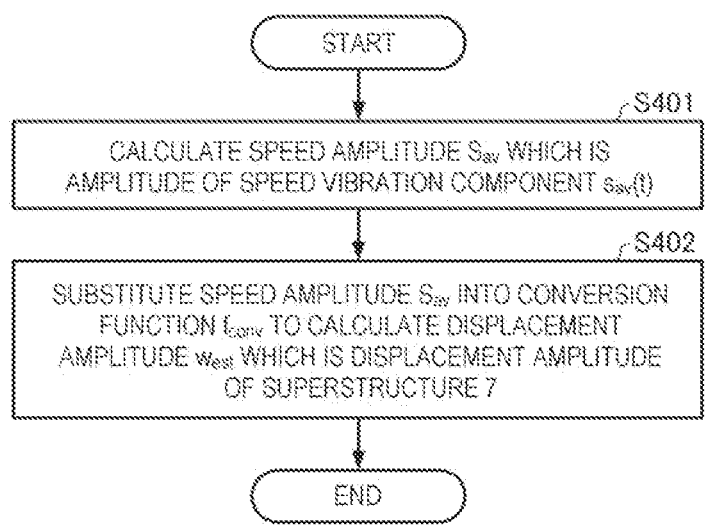
FIG. 16 is a flowchart showing an example of a procedure of a displacement amplitude estimation step in the first embodiment.

FIG. 16 is a flowchart showing an example of the procedure of the displacement amplitude estimation step S40 in FIG. 14.

As shown in FIG. 16, first, in step S401, the measurement device 1 calculates the speed amplitude $S_{av}$, which is the amplitude of the speed vibration component $s_{av}(t)$, as in the previously described Equation (10). The speed amplitude $S_{av}$ is a difference between the maximum value $\max\{s_{av}(t)\}$ and the minimum value $\min\{s_{av}(t)\}$ of the speed vibration component $s_{av}(t)$.

Then, in step S402, the measurement device 1 substitutes the speed amplitude $S_{av}$ calculated in step S401 into the conversion function $f_{conv}$ to calculate the displacement amplitude $w_{est}$, which is the displacement amplitude of the superstructure 7, as in the previously described Equation (11).

1-4. Configuration of Accelerometer, Measurement Device, and Monitoring Device

Figure 17:
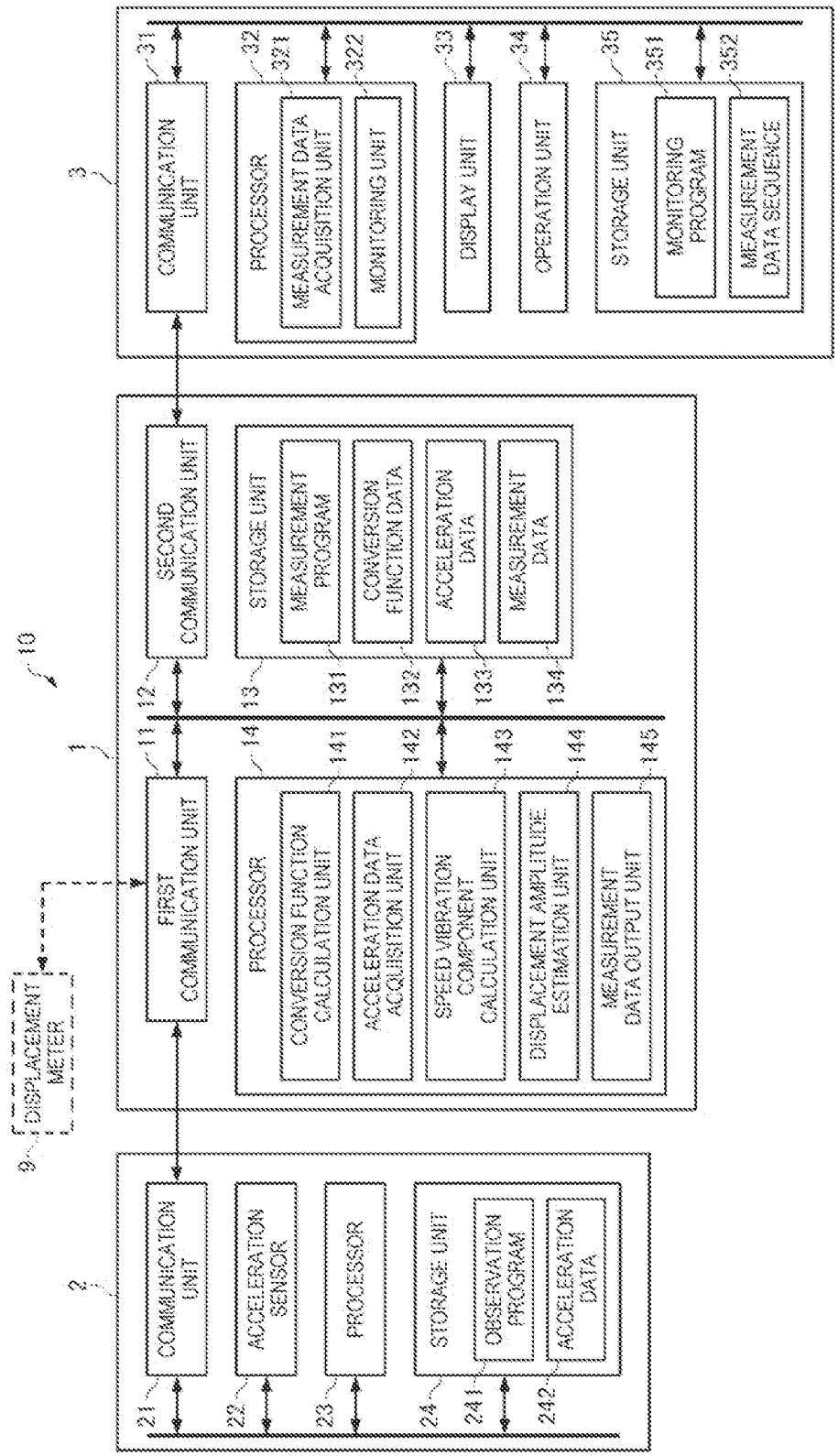
FIG. 17 is a diagram showing a configuration example of an accelerometer, a measurement device, and a monitoring device.

FIG. 17 is a diagram showing a configuration example of the accelerometer 2, the measurement device 1, and the monitoring device 3.

As shown in FIG. 17, the accelerometer 2 includes a communication unit 21, an acceleration sensor 22, a processor 23, and a storage unit 24.

The storage unit 24 is a memory that stores various programs, data, and the like for the processor 23 to perform calculation processing and control processing. The storage unit 24 stores programs, data, and the like for the processor 23 to implement predetermined application functions.

The acceleration sensor 22 detects an acceleration generated in each axial direction of the three axes.

The processor 23 controls the acceleration sensor 22 by executing an observation program 241 stored in the storage unit 24, generates acceleration data 242 based on the acceleration detected by the acceleration sensor 22, and stores the generated acceleration data 242 in the storage unit 24.

The communication unit 21 transmits the acceleration data 242 stored in the storage unit 24 to the measurement device 1 under the control of the processor 23.

As shown in FIG. 17, the measurement device 1 includes a first communication unit 11, a second communication unit 12, a storage unit 13, and a processor 14.

The first communication unit 11 receives the displacement data from the displacement meter 9 and outputs the received displacement data to the processor 14.

After the displacement meter 9 is removed and the accelerometer 2 is installed, the first communication unit 11 receives the acceleration data 242 from the accelerometer 2 and outputs the received acceleration data 242 to the processor 14.

The storage unit 13 is a memory that stores programs, data, and the like for the processor 14 to perform calculation processing and control processing. The storage unit 13 stores programs, data, and the like for the processor 14 to implement predetermined application functions. The processor 14 may receive various programs, data, and the like via the communication network 4 and store the programs, data, and the like in the storage unit 13.

The processor 14 calculates the conversion function $f_{conv}$ based on the displacement data received by the first communication unit 11, and stores the conversion function $f_{conv}$ in the storage unit 13 as conversion function data 132. The conversion function data 132 is, for example, data on each coefficient value of the conversion function $f_{conv}$.

The processor 14 also generates measurement data 134 based on the acceleration data 242 received by the first communication unit 11 and the conversion function data 132 stored in the storage unit 13, and stores the generated measurement data 134 in the storage unit 13.

In the present embodiment, the processor 14 functions as a conversion function calculation unit 141, an acceleration data acquisition unit 142, a speed vibration component calculation unit 143, a displacement amplitude estimation unit 144, and a measurement data output unit 145 by executing a measurement program 131 stored in the storage unit 13. That is, the processor 14 includes the conversion function calculation unit 141, the acceleration data acquisition unit 142, the speed vibration component calculation unit 143, the displacement amplitude estimation unit 144, and the measurement data output unit 145.

The conversion function calculation unit 141 acquires the displacement data received by the first communication unit 11, and calculates the conversion function $f_{conv}$ based on the acquired displacement data. Specifically, the conversion function calculation unit 141 acquires the displacement data output from the displacement meter 9 when the railway vehicle 6A moves on the superstructure 7 of the bridge 5, calculates the speed vibration component $s_{uv}(t)$ by performing the differential processing and the filter processing on the displacement $w_u(t)$ based on the acquired displacement data as in the previously described Equations (1) and (2), and calculates, as the conversion function $f_{conv}$, a function representing the relationship between the displacement amplitude $W_u$ which is the amplitude of the displacement $w_u(t)$ based on the acquired displacement data and the speed amplitude $S_{uv}$ which is the amplitude of the calculated speed vibration component $s_{uv}(t)$, as in the previously described Equations (5), (6), and (7). Then, the conversion function calculation unit 141 stores, as the conversion function data 132, the calculated data on each coefficient value of the conversion function $f_{conv}$ in the storage unit 13. That is, the conversion function calculation unit 141 performs the processing of the conversion function calculation step S10 in FIG. 14, specifically, the processing of steps S101, S102, and S103 in FIG. 15.

The acceleration data acquisition unit 142 acquires the acceleration data output from the accelerometer 2 when the railway vehicle 6 moves on the superstructure 7 of the bridge 5. Specifically, the acceleration data acquisition unit 142 acquires the acceleration data 242 received by the first communication unit 11, and stores the acceleration data 242 in the storage unit 13 as acceleration data 133. That is, the acceleration data acquisition unit 142 performs the processing of the acceleration data acquisition step S20 in FIG. 14.

The speed vibration component calculation unit 143 calculates the speed vibration component $s_{av}(t)$ by performing the integration processing and the filter processing on the acceleration $\alpha_a(t)$ based on the acceleration data acquired by the acceleration data acquisition unit 142. Specifically, the speed vibration component calculation unit 143 reads out the acceleration data 133 stored in the storage unit 13, and calculates the speed vibration component $s_{av}(t)$ by the previously described Equations (8) and (9). That is, the speed vibration component calculation unit 143 performs the processing of the speed vibration component calculation step S30 in FIG. 14.

The displacement amplitude estimation unit 144 estimates, based on the speed vibration component $s_{av}(t)$ calculated by the speed vibration component calculation unit 143 and the conversion function $f_{conv}$ calculated in advance by the conversion function calculation unit 141, the displacement amplitude $w_{est}$ which is the displacement amplitude of the superstructure 7 when the railway vehicle 6 moves on the superstructure 7 of the bridge 5. Specifically, the displacement amplitude estimation unit 144 calculates, as the speed amplitude $S_{av}$, the difference between the maximum value $\max\{s_{av}(t)\}$ and the minimum value $\min\{s_{av}(t)\}$ of the speed vibration component $s_{av}(t)$, as in the previously described Equation (10). Then, the displacement amplitude estimation unit 144 reads out the conversion function data 132 stored in the storage unit 13, and calculates the displacement amplitude $w_{est}$ by substituting the calculated speed amplitude $S_{av}$ into the conversion function $f_{conv}$, as in the previously described Equation (11). That is, the displacement amplitude estimation unit 144 performs the processing of the displacement amplitude estimation step S40 in FIG. 14, specifically, the processing of steps S401 and S402 in FIG. 16.

The displacement amplitude $w_{est}$ is stored in the storage unit 13 as at least a part of the measurement data 134. The measurement data 134 may include the speed vibration component $s_{av}(t)$, the speed amplitude $S_{av}$, and the like in addition to the displacement amplitude $w_{est}$.

The measurement data output unit 145 reads out the measurement data 134 stored in the storage unit 13 and outputs the measurement data 134 to the monitoring device 3. Specifically, under the control of the measurement data output unit 145, the second communication unit 12 transmits the measurement data 134 stored in the storage unit 13 to the monitoring device 3 via the communication network 4. That is, the measurement data output unit 145 performs the processing of the measurement data output step S50 in FIG. 14.

As described above, the measurement program 131 is a program that causes the measurement device 1, which is a computer, to execute each procedure of the flowchart shown in FIG. 14.

As shown in FIG. 17, the monitoring device 3 includes a communication unit 31, a processor 32, a display unit 33, an operation unit 34, and a storage unit 35.

The communication unit 31 receives the measurement data 134 from the measurement device 1 and outputs the received measurement data 134 to the processor 32.

The display unit 33 displays various types of information under the control of the processor 32. The display unit 33 may be, for example, a liquid crystal display or an organic EL display. EL is an abbreviation for electro luminescence.

The operation unit 34 outputs operation data corresponding to an operation by a user to the processor 32. The operation unit 34 may be, for example, an input device such as a mouse, a keyboard, or a microphone.

The storage unit 35 is a memory that stores various programs, data, and the like for the processor 32 to perform calculation processing and control processing. The storage unit 35 stores programs, data, and the like for the processor 32 to implement predetermined application functions.

The processor 32 acquires the measurement data 134 received by the communication unit 31, generates evaluation information by evaluating a temporal change in the displacement amplitude $w_{est}$ of the superstructure 7 based on the acquired measurement data 134, and displays the generated evaluation information on the display unit 33.

In the present embodiment, the processor 32 functions as a measurement data acquisition unit 321 and a monitoring unit 322 by executing a monitoring program 351 stored in the storage unit 35. That is, the processor 32 includes the measurement data acquisition unit 321 and the monitoring unit 322.

The measurement data acquisition unit 321 acquires the measurement data 134 received by the communication unit 31, and adds the acquired measurement data 134 to a measurement data sequence 352 stored in the storage unit 35.

The monitoring unit 322 statistically evaluates, based on the measurement data sequence 352 stored in the storage unit 35, a temporal change in the displacement amplitude $w_{est}$ of the superstructure 7. Then, the monitoring unit 322 generates evaluation information indicating an evaluation result, and displays the generated evaluation information on the display unit 33. The user can monitor a state of the superstructure 7 based on the evaluation information displayed on the display unit 33.

The monitoring unit 322 may perform processing such as monitoring of the railway vehicle 6 and determination of an abnormality in the superstructure 7 based on the measurement data sequence 352 stored in the storage unit 35.

The processor 32 transmits, based on the operation data output from the operation unit 34, information for adjusting operation states of the measurement device 1 and the accelerometer 2 to the measurement device 1 via the communication unit 31. The operation state of the measurement device 1 is adjusted according to the information received via the second communication unit 12. The measurement device 1 transmits information for adjusting the operation state of the accelerometer 2 received via the second communication unit 12 to the accelerometer 2 via the first communication unit 11. The operation state of the accelerometer 2 is adjusted according to the information received via the communication unit 21.

In the processors 14, 23, and 32, for example, the functions of the respective units may be implemented by individual hardware, or the functions of the respective units may be implemented by integrated hardware. For example, the processors 14, 23, and 32 include hardware, and the hardware may include at least one of a circuit that processes a digital signal and a circuit that processes an analog signal. The processors 14, 23, and 32 may be a CPU, a GPU, a DSP, or the like. CPU is an abbreviation for central processing unit. GPU is an abbreviation for graphics processing unit. DSP is an abbreviation for digital signal processor. The processors 14, 23, and 32 may be configured as custom ICs such as ASICs so as to implement the functions of the respective units, or may implement the functions of the respective units by a CPU and an ASIC. ASIC is an abbreviation for application specific integrated circuit. IC is an abbreviation for integrated circuit.

The storage units 13, 24, and 35 are implemented by, for example, various IC memories such as a ROM, a flash ROM, and a RAM, and a recording medium such as a hard disk, and a memory card. ROM is an abbreviation for read only memory. RAM is an abbreviation for random access memory. IC is an abbreviation for integrated circuit. The storage units 13, 24, and 35 include a non-volatile information storage device that is a computer-readable device or a medium, and various programs, data, and the like may be stored in the information storage device. The information storage device may be an optical disk such as an optical disk DVD or a CD, a hard disk drive, or various memories such as a card type memory or a ROM.

Although only one accelerometer 2 is shown in FIG. 17, each of a plurality of the accelerometers 2 may generate the acceleration data 242 and transmit the acceleration data 242 to the measurement device 1. In this case, the measurement device 1 receives the plurality of pieces of acceleration data 242 transmitted from the plurality of accelerometers 2, generates the plurality of pieces of measurement data 134, and transmits the plurality of pieces of measurement data 134 to the monitoring device 3. The monitoring device 3 receives the plurality of pieces of measurement data 134 transmitted from the measurement device 1, and monitors the states of the plurality of superstructures 7 based on the plurality of pieces of received measurement data 134.

1-5. Function and Effect

In the measurement method according to the first embodiment described above, since the displacement meter 9 directly measures the displacement of the superstructure 7 of the bridge 5, drift does not occur in the displacement $w_u(t)$ based on the displacement data output from the displacement meter 9. Therefore, the conversion function $f_{conv}$ calculated in advance based on the displacement data output from the displacement meter 9 when the railway vehicle 6A moves on the superstructure 7 has relatively high conversion accuracy. Specifically, the measurement device 1 calculates, as the conversion function $f_{conv}$, the function representing the relationship between the displacement amplitude $W_u$, which is the amplitude of the displacement $w_u(t)$ measured with high accuracy by the displacement meter 9, and the speed amplitude $S_{uv}$, which is the amplitude of the speed vibration component $s_{uv}(t)$ with high accuracy obtained by performing the differential processing and the filter processing on the displacement $w_u(t)$. Therefore, the conversion function $f_{conv}$ with high accuracy can be obtained. Since the measurement device 1 calculates the speed vibration component $s_{av}(t)$ by performing the integration processing and the filter processing on the acceleration $\alpha_a(t)$ based on the acceleration data output from the accelerometer 2 when the railway vehicle 6 moves on the superstructure 7, the drift included in the speed vibration component $s_{av}(t)$ is reduced by the filter processing. Then, the measurement device 1 estimates, based on the speed vibration component $s_{av}(t)$ and the conversion function $f_{conv}$, the displacement amplitude $w_{est}$ of the superstructure 7 when the railway vehicle 6 moves on the superstructure 7. Therefore, the influence of a significant drift caused by twice integrating the acceleration $\alpha_a(t)$ does not occur. Therefore, according to the measurement method according to the first embodiment, the measurement device 1 can accurately estimate, based on the speed vibration component $s_{av}(t)$ in which the drift is reduced and the conversion function $f_{conv}$ with high accuracy, the displacement amplitude $w_{est}$ of the superstructure 7 when the railway vehicle 6 moves on the superstructure 7.

In the measurement method according to the first embodiment, since the measurement device 1 is not affected by a significant drift caused by twice integrating the acceleration $\alpha_a(t)$, no drift correction processing is required. Further, the measurement device 1 estimates the simpler displacement amplitude $w_{est}$ rather than the displacement waveform of the superstructure 7 when the railway vehicle 6 moves on the superstructure 7 by a simple calculation of calculating the speed vibration component $s_{av}(t)$ by performing the integration processing and the filter processing on the acceleration $\alpha_a(t)$, calculating the speed amplitude $S_{av}$ which is the difference between the maximum value and the minimum value of the speed vibration component $s_{av}(t)$, and substituting the speed amplitude $S_{av}$ into the conversion function $f_{conv}$. Therefore, according to the measurement method in the first embodiment, an amount of calculation for the measurement device 1 to estimate the displacement amplitude $w_{est}$ is small, and it is possible to implement an increase in speed and a reduction in cost of the estimation processing.

According to the measurement method in the first embodiment, the measurement device 1 calculates the displacement amplitude $W_u$ which is the difference between the maximum value and the minimum value of the displacement $w_u(t)$, and calculates the speed amplitude $S_{uv}$ which is the difference between the maximum value and the minimum value of the speed vibration component $s_{uv}(t)$, so that the displacement amplitude $W_u$ and the speed amplitude $S_{uv}$ can be calculated with a small amount of calculation. According to the measurement method in the first embodiment, the measurement device 1 can calculate the conversion function $f_{conv}$ with high accuracy by using a maximum amplitude of high S/N as both the displacement amplitude $W_u$ and the speed amplitude $S_{uv}$.

According to the measurement method in the first embodiment, since the measurement device 1 uses the accelerometer 2 which has a higher degree of freedom of installation than the displacement meter 9 and a distortion gauge and can be easily installed in order to estimate the displacement amplitude $w_{est}$, reduction in cost of the measurement system 10 is possible.

2. Second Embodiment

Hereinafter, in a second embodiment, the same components as those in the first embodiment will be denoted by the same reference numerals, repetitive description as that in the first embodiment will be omitted or simplified, and contents different from those in the first embodiment will be mainly described.

Since a change in response or noise is superimposed on the displacement data output from the displacement meter 9, in the second embodiment, the measurement device 1 calculates the conversion function $f_{conv}$ for estimating a displacement amplitude waveform in order to improve estimation accuracy of the displacement of the superstructure 7.

Specifically, first, the measurement device 1 performs low-pass filter processing on the displacement $w_u(t)$ based on the displacement data output from the displacement meter 9 to calculate a displacement $w_{u\_lpf}(t)$ as in Equation (12).

$$w_{u\_lpf}(t) = f_{LPF}(w_u(t)) \quad (12)$$

Figure 18:
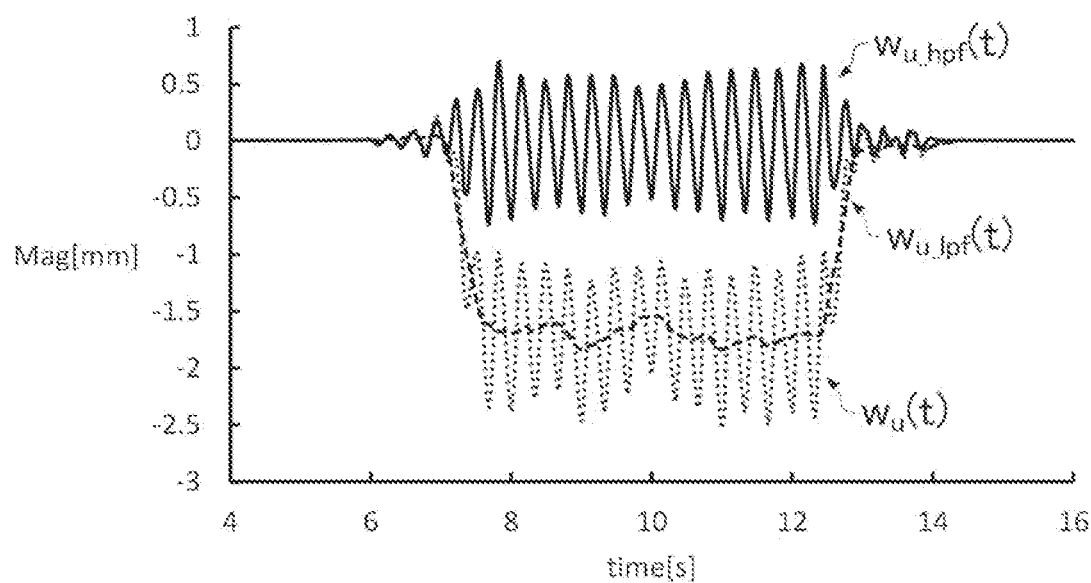
FIG. 18 is a diagram showing an example of displacements $w_u(t)$ and $w_{u\_lpf}(t)$ and a displacement vibration component $w_{u\_hpf}(t)$.

Next, the measurement device 1 performs high-pass filter processing on the displacement $w_u(t)$ to calculate a displacement vibration component $w_{u\_hpf}(t)$ as in Equation (13). FIG. 18 shows an example of the displacements $w_u(t)$, $w_{u\_lpf}(t)$ and the displacement vibration component $w_{u\_hpf}(t)$.

$$w_{u\_hpf}(t) = f_{HPF}(w_u(t)) = w_u(t) - f_{LPF}(w_u(t)) \quad (13)$$

Figure 19:
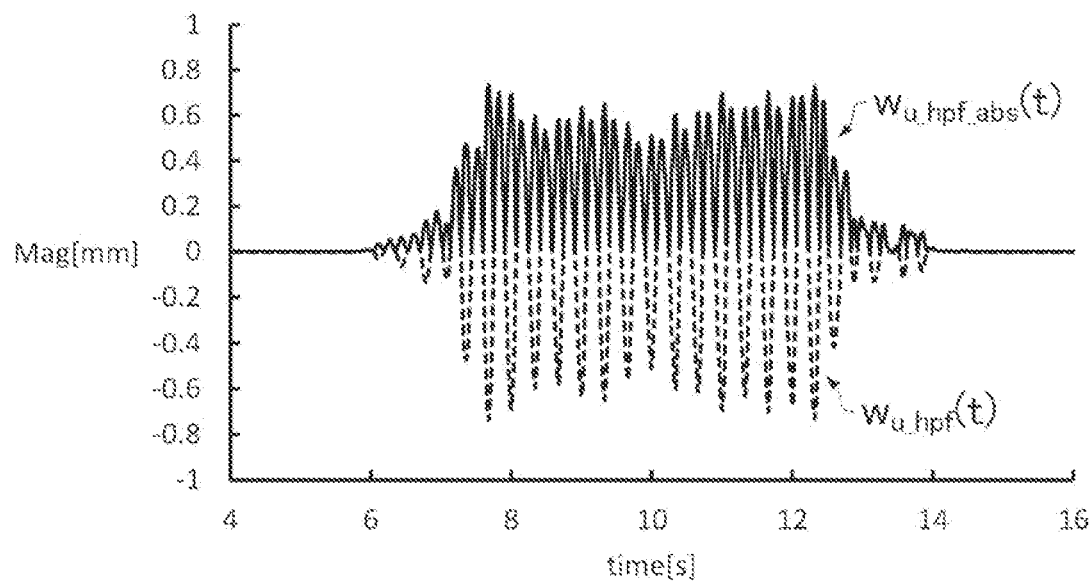
FIG. 19 is a diagram showing an example of an absolute value $w_{u\_hpf\_abs}(t)$ of $w_{u\_hpf}(t)$.
Figure 20:
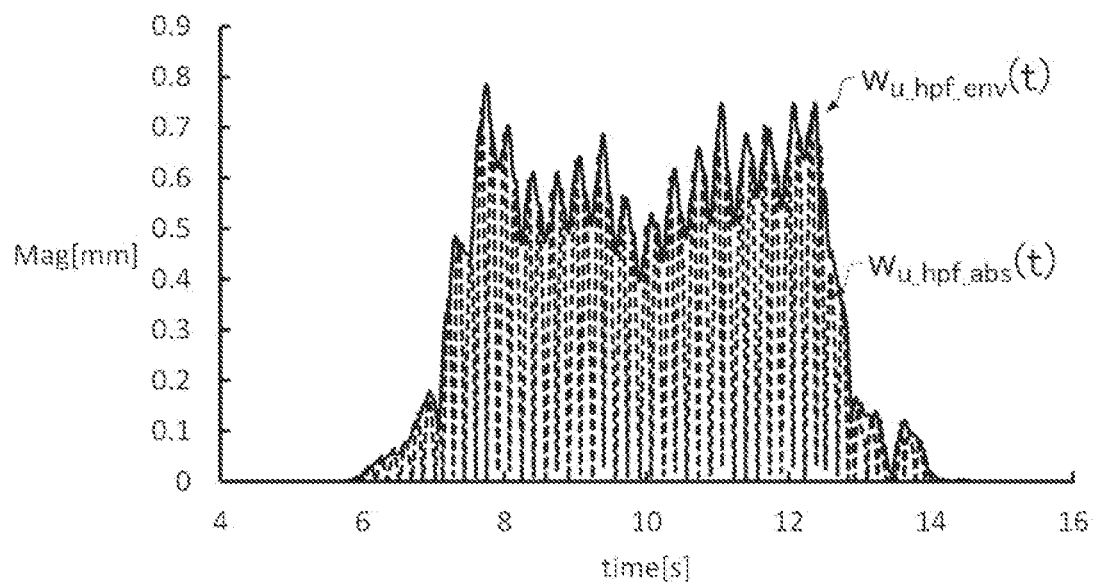
FIG. 20 is a diagram showing an example of an envelope $w_{u\_hpf\_env}(t)$.

Next, the measurement device 1 performs the low-pass filter processing on an absolute value $w_{u\_hpf\_abs}(t)$ of the displacement vibration component $w_{u\_hpf}(t)$ to calculate an envelope $w_{u\_hpf\_env}(t)$ as in Equation (14). FIG. 19 shows an example of the absolute value $w_{u\_hpf\_abs}(t)$ of $w_{u\_hpf}(t)$ in FIG. 18. FIG. 20 shows an example of the envelope $w_{u\_hpf\_env}(t)$ obtained by performing the low-pass filter processing on the absolute value $W_{u\_hpf\_abs}(t)$ in FIG. 19.

$$w_{u\_hpf\_env}(t) = \frac{\pi}{2} f_{LPF}(w_{u\_hpf\_abs}(t)) = \frac{\pi}{2} f_{LPF}(|w_{u\_hpf}(t)|) \quad (14)$$

Figure 21:
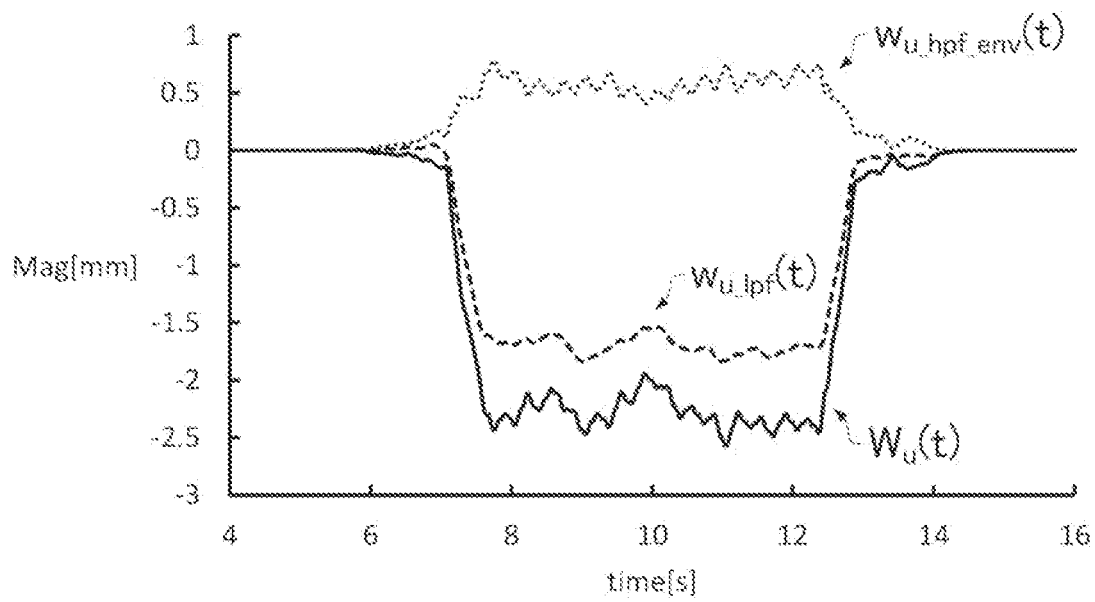
FIG. 21 is a diagram showing an example of a displacement amplitude $W_u(t)$.

Next, the measurement device 1 calculates a displacement amplitude $W_u(t)$ based on the envelope $w_{u\_hpf\_env}(t)$ and the displacement $w_{u\_lpf}(t)$ as in Equation (15). FIG. 21 shows an example of the displacement amplitude $W_u(t)$ calculated from the envelope $w_{u\_hpf\_env}(t)$ in FIG. 20 and $w_{u\_lpf}(t)$ in FIG. 18 by using Equation (15).

$$W_u(t) = w_{u\_lpf}(t) - w_{u\_hpf\_env}(t) \quad (15)$$

Figure 22:
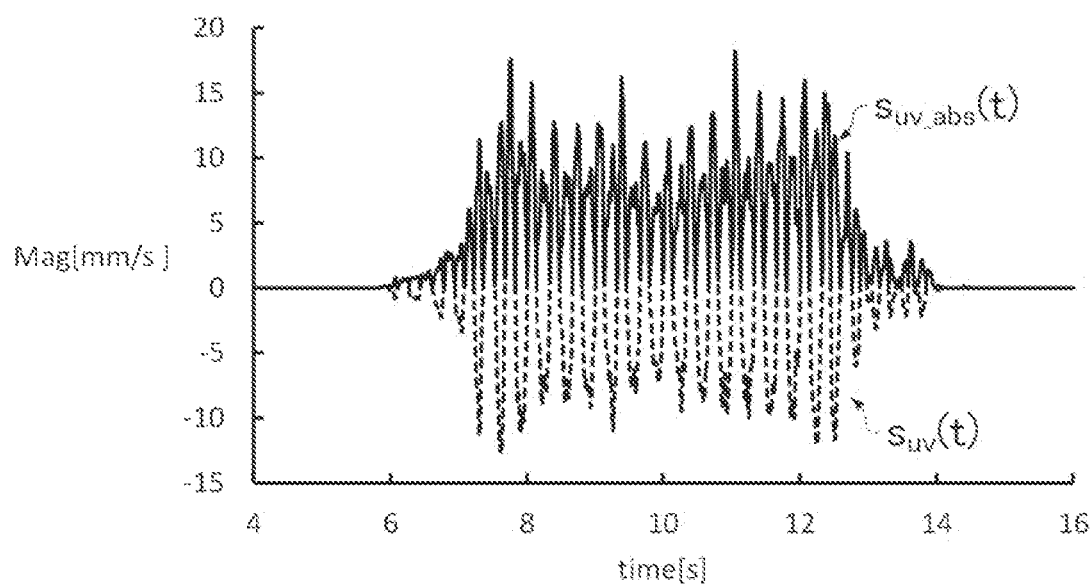
FIG. 22 is a diagram showing an example of an absolute value $s_{uv\_abs}(t)$ of the speed vibration component $s_{uv}(t)$.
Figure 23:
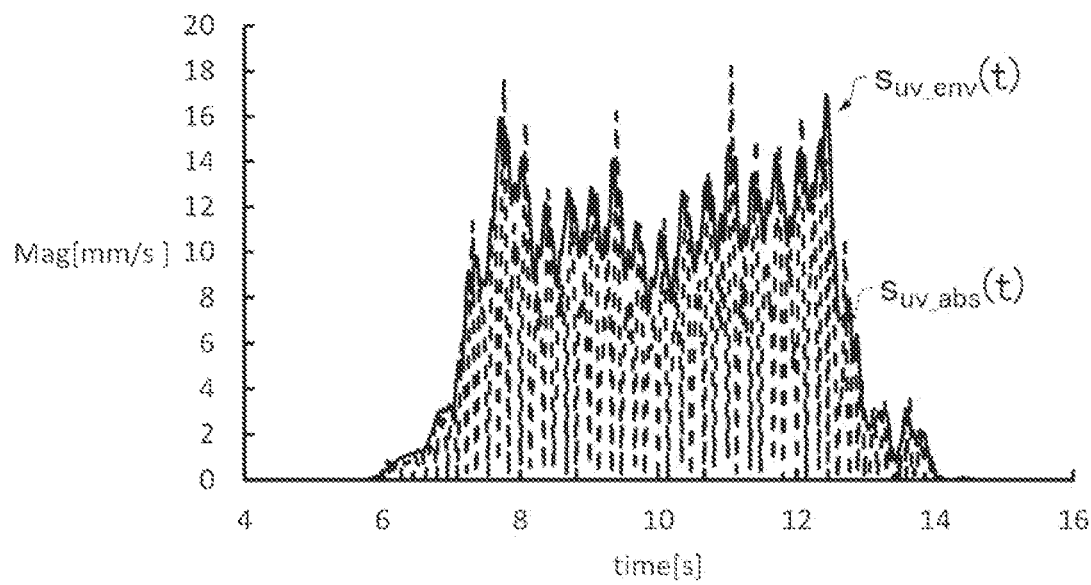
FIG. 23 is a diagram showing an example of an envelope $s_{uv\_env}(t)$.

Next, as in Equation (16), the measurement device 1 calculates an envelope $s_{uv\_env}(t)$ by performing the low-pass filter processing on an absolute value $s_{uv\_abs}(t)$ of the speed vibration component $s_{uv}(t)$ calculated by the previously described Equations (1) and (2). FIG. 22 shows an example of the absolute value $s_{uv\_abs}(t)$ of the speed vibration component $s_{uv}(t)$. FIG. 23 shows an example of the envelope $s_{uv\_env}(t)$ obtained by performing the low-pass filter processing on the absolute value $s_{uv\_abs}(t)$ of the speed vibration component $s_{uv}(t)$ shown in FIG. 22.

$$s_{uv\_env}(t) = \frac{\pi}{2} f_{LPF}(s_{uv\_abs}(t)) = \frac{\pi}{2} f_{LPF}(|s_{uv}(t)|) \quad (16)$$

Next, the measurement device 1 calculates the conversion function $f_{conv}$ from the displacement amplitude $W_u(t)$ and the envelope $s_{uv\_env}(t)$.

Specifically, first, the relationship between the displacement amplitude $W_u(t)$ and the envelope $s_{uv\_env}(t)$ is assumed as in Equation (17).

$$W_u(t) = R_{uv} s_{uv\_env}(t) + R_0 \quad (17)$$

Then, the measurement device 1 calculates coefficients $R_{uv}$ and $R_0$ that minimize an error e(t) between the displacement amplitude $W_u(t)$ and the envelope $s_{uv\_env}(t)$ shown in Equation (18) by a least-squares method, as in Equation (19) and Equation (20).

$$e(t) = W_u(t) - (R_{uv}s_{uv\_env}(t) + R_0) \quad (18)$$

$$R_{uv} = \frac{n\sum_{k=t_1}^{t_2} W_u(t)s_{uv_{env}}(t) - \sum_{k=t_1}^{t_2} W_u(t)\sum_{k=t_1}^{t_2} s_{uv_{env}}(t)}{n\sum_{k=t_1}^{t_2} s_{uv_{env}}(t)^2 - \sum_{k=t_1}^{t_2} s_{uv_{env}}(t)\sum_{k=t_1}^{t_2} s_{uv_{env}}(t)} \quad (19)$$

$$R_0 = \frac{\sum_{k=t_1}^{t_2} W_u(t) - R_{uv}\sum_{k=t_1}^{t_2} s_{uv_{env}}(t)}{n} \quad (20)$$

Figure 24:
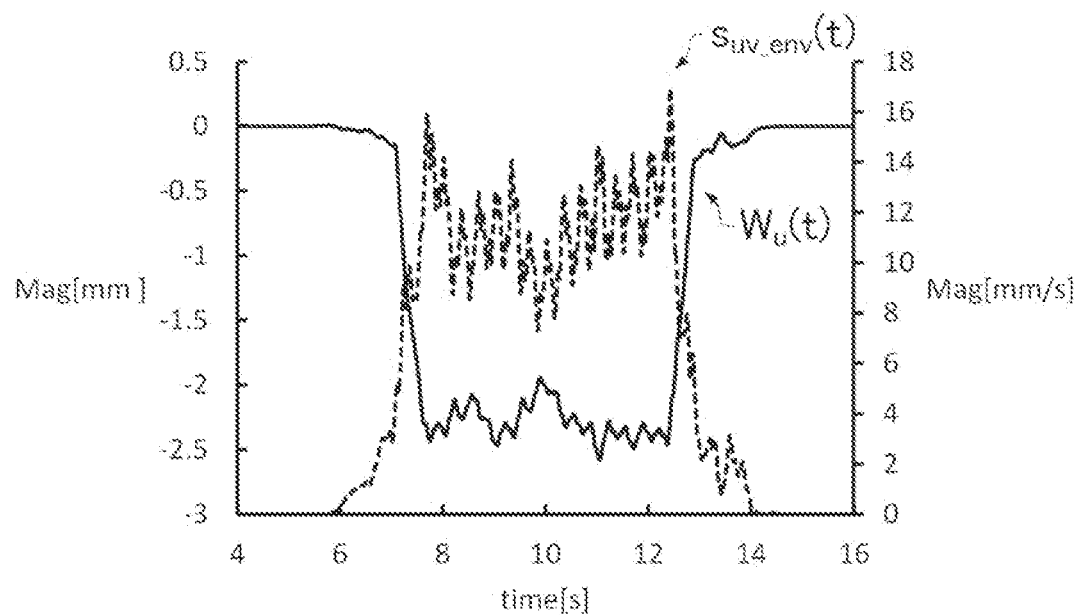
FIG. 24 is a diagram showing the displacement amplitude $W_u(t)$ and the envelope $s_{uv\_env}(t)$ in an overlapping manner.
Figure 25:
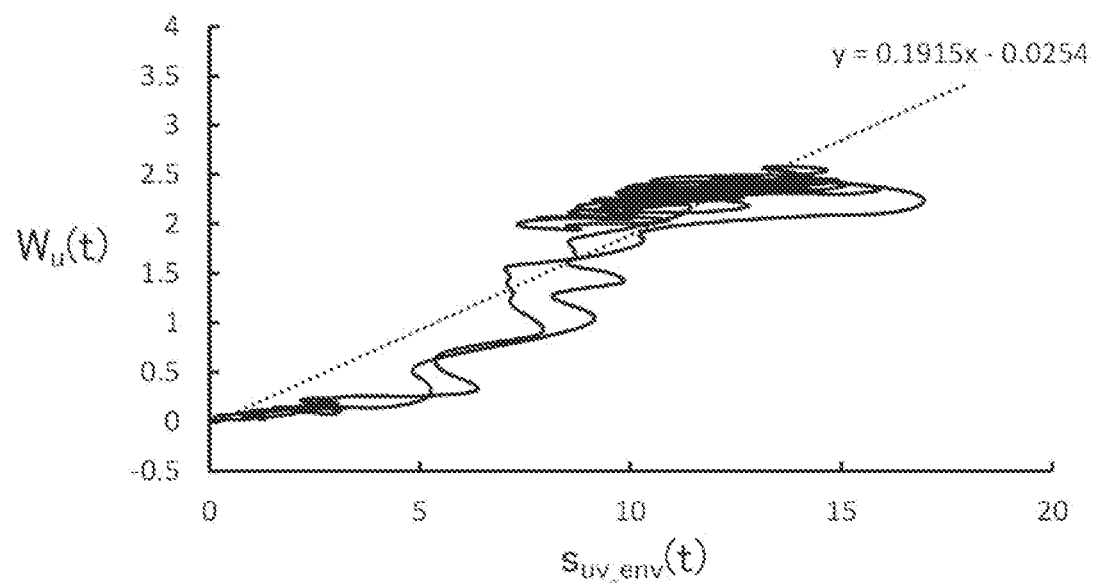
FIG. 25 is a diagram showing a relationship between the displacement amplitude $W_u(t)$ and the envelope $s_{uv\_env}(t)$.

FIG. 24 shows the displacement amplitude $W_u(t)$ in FIG. 21 and the envelope $s_{uv\_env}(t)$ in FIG. 23 in an overlapping manner. FIG. 25 shows the relationship between the displacement amplitude $W_u(t)$ and the envelope $s_{uv\_env}(t)$ in FIG. 24. In the example of FIG. 25, the coefficient $R_{uv}$ is 0.1915, and the coefficient $R_0$ is −0.0254.

For example, the measurement device 1 sets the conversion function $f_{conv}$ as a linear function, sets the coefficient $R_{uv}$ calculated by Equation (19) as a linear coefficient of the conversion function $f_{conv}$, and sets the coefficient $R_0$ calculated by Equation (20) as a zero-order coefficient of the conversion function $f_{conv}$.

Here, the measurement by the displacement meter 9 and the calculation of the conversion function $f_{conv}$ are completed. The displacement meter 9 that is temporarily installed is removed. Further, the accelerometer 2 is installed on the superstructure 7 of the bridge 5, and the accelerometer 2 detects the acceleration when the railway vehicle 6 passes through the superstructure 7.

First, the measurement device 1 acquires the acceleration data output from the accelerometer 2, and integrates the acceleration $\alpha_a(t)$ based on the acceleration data to calculate the integral speed $v_a(t)$, as in the previously described Equation (8).

Further, the measurement device 1 performs the high-pass filter processing on the integral speed $v_a(t)$ to calculate the speed vibration component $s_{av}(t)$, as in the previously described Equation (9). The measurement device 1 may calculate the speed vibration component $s_{av}(t)$ by performing the band-pass filter processing on the integral speed $v_a(t)$.

Figure 26:
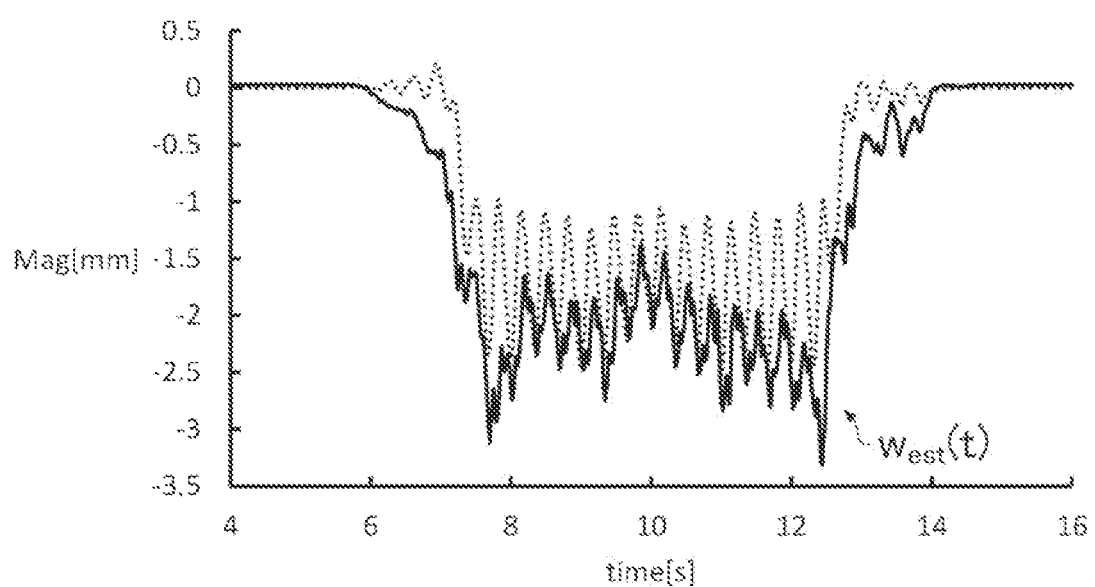
FIG. 26 is a diagram showing an example of a displacement amplitude $w_{est}(t)$.

Then, the measurement device 1 estimates a displacement amplitude $w_{est}(t)$ of the superstructure 7 when the railway vehicle 6 passes through the superstructure 7 of the bridge 5 by using the speed vibration component $s_{av}(t)$ and the conversion function $f_{conv}$, as in Equation (21). FIG. 26 shows an example of the displacement amplitude $w_{est}(t)$. In FIG. 26, a broken line indicates a displacement waveform for comparison.

$$w_{est}(t)=f_{conv}(s_{av}(t))=R_{uv}s_{av}(t)+R_0 \quad (21)$$

The procedure of the measurement method according to the second embodiment is the same as the procedure of the measurement method according to the first embodiment shown in FIG. 14, and thus the illustration of the flowchart is omitted. In the second embodiment, a procedure of the conversion function calculation step S10 and a procedure of the displacement amplitude estimation step S40 in FIG. 14 are different from those in the first embodiment.

Figure 27:
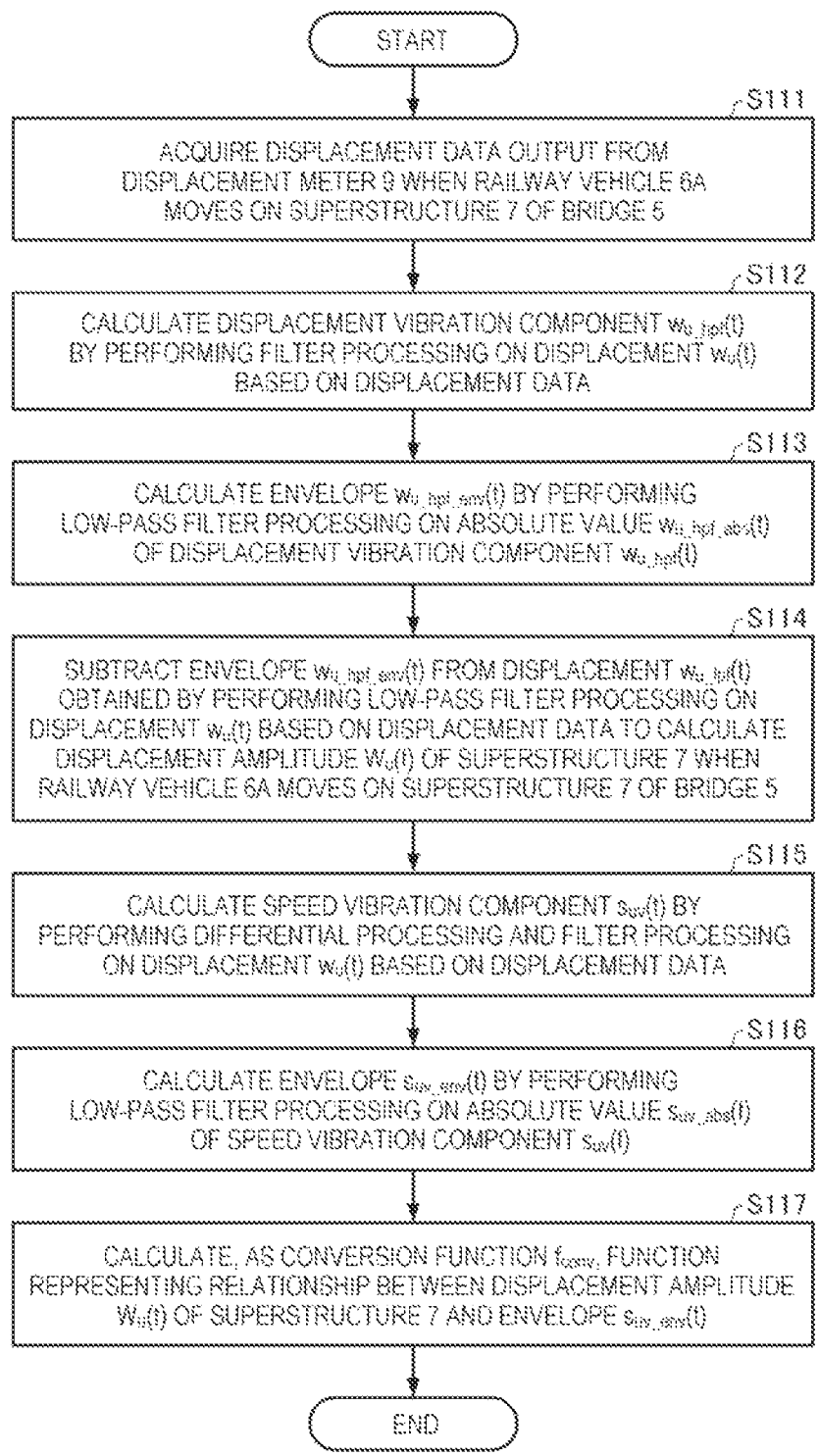
FIG. 27 is a flowchart showing an example of a procedure of a conversion function calculation step in a second embodiment.

FIG. 27 is a flowchart showing an example of the procedure of the conversion function calculation step S10 in FIG. 14 in the second embodiment.

As shown in FIG. 27, first, in step S111, the measurement device 1 acquires displacement data output from the displacement meter 9 when the railway vehicle 6A moves on the superstructure 7 of the bridge 5. The railway vehicle 6A is an example of a second moving body.

Next, in step S112, the measurement device 1 calculates the displacement vibration component $w_{u\_hpf}(t)$ by performing the filter processing on the displacement $w_u(t)$ based on the displacement data acquired in step S111, as in the previously described Equations (12) and (13). For example, the filter processing may be high-pass filter processing or band-pass filter processing.

Next, in step S113, the measurement device 1 calculates the envelope $w_{u\_hpf\_env}(t)$ by performing the low-pass filter processing on the absolute value $w_{u\_hpf\_abs}(t)$ of the displacement vibration component $w_{u\_hpf}(t)$ calculated in step S112, as in the previously described Equation (14). The envelope $w_{u\_hpf\_env}(t)$ is an example of a first envelope.

Next, in step S114, the measurement device 1 subtracts the envelope $w_{u\_hpf\_env}(t)$ calculated in step S113 from the displacement $w_{u\_lpf}(t)$ obtained by performing the low-pass filter processing on the displacement $w_u(t)$ based on the displacement data acquired in step S111, as in the previously described Equation (15), and calculates the displacement amplitude $W_u(t)$ of the superstructure 7 when the railway vehicle 6A moves on the superstructure 7 of the bridge 5.

Next, in step S115, the measurement device 1 calculates the speed vibration component $s_{uv}(t)$ by performing the differential processing and the filter processing on the displacement $w_u(t)$ based on the displacement data acquired in step S111, as in the previously described Equations (1) and (2). The speed vibration component $s_{uv}(t)$ is an example of a second speed vibration component.

Next, in step S116, the measurement device 1 calculates the envelope $s_{uv\_env}(t)$ by performing the low-pass filter processing on the absolute value $s_{uv\_abs}(t)$ of the speed vibration component $s_{uv}(t)$ calculated in step S115, as in the previously described Equation (16). The envelope $s_{uv\_env}(t)$ is an example of a second envelope.

Finally, in step S117, the measurement device 1 calculates, as the conversion function $f_{conv}$, a function representing the relationship between the displacement amplitude $W_u(t)$ of the superstructure 7 calculated in step S114 and the envelope $s_{uv\_env}(t)$ calculated in step S116, as in the previously described Equations (17) to (20).

Figure 28:
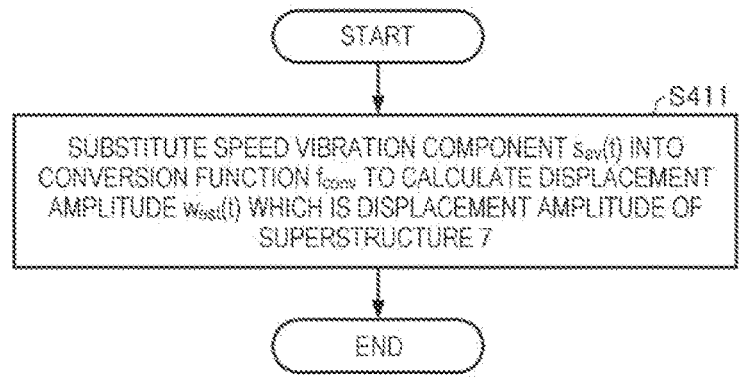
FIG. 28 is a flowchart showing an example of a procedure of a displacement amplitude estimation step in the second embodiment.

FIG. 28 is a flowchart showing an example of the procedure of the displacement amplitude estimation step S40 in FIG. 14 in the second embodiment.

As shown in FIG. 28, in step S411, the measurement device 1 substitutes the speed vibration component $s_{av}(t)$ calculated in the speed vibration component calculation step S30 in FIG. 14 into the conversion function $f_{conv}$ to calculate the displacement amplitude $w_{est}(t)$, which is the displacement amplitude of the superstructure 7, as in the previously described Equation (21).

Since the configurations of the accelerometer 2, the measurement device 1, and the monitoring device 3 in the second embodiment are the same as those in FIG. 17, the illustration thereof is omitted. In the second embodiment, a function of the processor 14 of the measurement device 1 is different from that of the first embodiment.

In the measurement device 1 according to the second embodiment, similarly to the first embodiment, the processor 14 functions as the conversion function calculation unit 141, the acceleration data acquisition unit 142, the speed vibration component calculation unit 143, the displacement amplitude estimation unit 144, and the measurement data output unit 145 by executing the measurement program 131 stored in the storage unit 13. That is, the processor 14 includes the conversion function calculation unit 141, the acceleration data acquisition unit 142, the speed vibration component calculation unit 143, the displacement amplitude estimation unit 144, and the measurement data output unit 145.

Since the functions of the acceleration data acquisition unit 142, the speed vibration component calculation unit 143, and the measurement data output unit 145 are the same as those in the first embodiment, the description thereof is omitted. Also in the second embodiment, the acceleration data acquisition unit 142 performs the processing of the acceleration data acquisition step S20 in FIG. 14. The speed vibration component calculation unit 143 performs the processing of the speed vibration component calculation step S30 in FIG. 14. The measurement data output unit 145 performs the processing of the measurement data output step S50 in FIG. 14.

The conversion function calculation unit 141 acquires the displacement data received by the first communication unit 11, and calculates the conversion function $f_{conv}$ based on the acquired displacement data. Specifically, the conversion function calculation unit 141 acquires the displacement data output from the displacement meter 9 when the railway vehicle 6A moves on the superstructure 7 of the bridge 5, calculates the displacement vibration component $w_{u\_hpf}(t)$ by performing the filter processing on the displacement $w_u(t)$ based on the acquired displacement data as in the previously described Equations (12) and (13), and calculates the envelope $w_{u\_hpf\_env}(t)$ by performing the low-pass filter processing on the absolute value $w_{u\_hpf\_abs}(t)$ of the calculated displacement vibration component $w_{u\_hpf}(t)$ as in the previously described Equation (14). Further, the conversion function calculation unit 141 subtracts the envelope $w_{u\_hpf\_env}(t)$ from the displacement $w_{u\_lpf}(t)$ obtained by performing the low-pass filter processing on the displacement $w_u(t)$, as in the previously described Equation (15), and calculates the displacement amplitude $W_u(t)$ of the superstructure 7 when the railway vehicle 6A moves on the superstructure 7 of the bridge 5. The conversion function calculation unit 141 calculates the speed vibration component $s_{uv}(t)$ by performing the differential processing and the filter processing on the displacement $w_u(t)$, as in the previously described Equations (1) and (2), and calculates the envelope $s_{uv\_env}(t)$ by performing the low-pass filter processing on the absolute value $s_{uv\_abs}(t)$ of the calculated speed vibration component $s_{uv}(t)$. Then, the conversion function calculation unit 141 calculates, as the conversion function $f_{conv}$, a function representing the relationship between the calculated displacement amplitude $W_u(t)$ of the superstructure 7 and the calculated envelope $s_{uv\_env}(t)$, as in the previously described Equations (17) to (20), and stores the data on each coefficient value of the calculated conversion function $f_{conv}$ in the storage unit 13 as the conversion function data 132. That is, the conversion function calculation unit 141 performs the processing of the conversion function calculation step S10 in FIG. 14, specifically, the processing of steps S111 to S117 in FIG. 27.

The displacement amplitude estimation unit 144 estimates, based on the speed vibration component $s_{av}(t)$ calculated by the speed vibration component calculation unit 143 and the conversion function $f_{conv}$ calculated in advance by the conversion function calculation unit 141, the displacement amplitude $w_{est}(t)$, which is the displacement amplitude of the superstructure 7 when the railway vehicle 6 moves on the superstructure 7 of the bridge 5. Specifically, the displacement amplitude estimation unit 144 substitutes the speed vibration component $s_{av}(t)$ into the conversion function $f_{conv}$ to calculate the displacement amplitude $w_{est}(t)$, which is the displacement amplitude of the superstructure 7, as in the previously described Equation (21). That is, the displacement amplitude estimation unit 144 performs the processing of the displacement amplitude estimation step S40 in FIG. 14, specifically, the processing of step S411 in FIG. 28.

The displacement amplitude $w_{est}(t)$ is stored in the storage unit 13 as at least a part of the measurement data 134. The measurement data 134 may include the speed vibration component $s_{av}(t)$ or the like in addition to the displacement amplitude $w_{est}(t)$.

Since other configurations of the measurement device 1 according to the second embodiment are the same as those of the first embodiment, the description thereof is omitted.

In the measurement method in the second embodiment described above, the measurement device 1 calculates, based on the displacement $w_u(t)$ measured by the displacement meter 9, the envelope $w_{u\_hpf\_env}(t)$ of the displacement vibration component $w_{u\_hpf}(t)$ and the envelope $s_{uv\_env}(t)$ of the speed vibration component $s_{uv}(t)$, and calculates the conversion function $f_{conv}$ based on the envelope $w_{u\_hpf\_env}(t)$ and the envelope $s_{uv\_env}(t)$. Therefore, a conversion function $f_{conv}$ with higher accuracy is obtained in which the fluctuation included in the displacement $w_u(t)$ and the influence of noise are reduced. Since the measurement device 1 calculates the speed vibration component $s_{av}(t)$ by performing the integration processing and the filter processing on the acceleration $\alpha_a(t)$ based on the acceleration data output from the accelerometer 2 when the railway vehicle 6 moves on the superstructure 7, the drift included in the speed vibration component $s_{av}(t)$ is reduced by the filter processing. Then, the measurement device 1 estimates, based on the speed vibration component $s_{av}(t)$ and the conversion function $f_{conv}$, the displacement amplitude $w_{est}(t)$ of the superstructure 7 when the railway vehicle 6 moves on the superstructure 7. Therefore, the influence of a significant drift caused by twice integrating the acceleration $\alpha_a(t)$ does not occur. Therefore, according to the measurement method according to the second embodiment, the measurement device 1 can accurately estimate, based on the speed vibration component $s_{av}(t)$ in which the drift is reduced and the conversion function $f_{conv}$ with high accuracy, the displacement amplitude $w_{est}(t)$ of the superstructure 7 when the railway vehicle 6 moves on the superstructure 7.

In the measurement method according to the second embodiment, since the measurement device 1 is not affected by a significant drift caused by twice integrating the acceleration $\alpha_a(t)$, no drift correction processing is required. Further, the measurement device 1 estimates the simpler displacement amplitude $w_{est}(t)$ rather than the displacement waveform of the superstructure 7 when the railway vehicle 6 moves on the superstructure 7 by a simple calculation of calculating the speed vibration component $s_{av}(t)$ by performing the integration processing and the filter processing on the acceleration $\alpha_a(t)$ and substituting the speed vibration component $s_{av}(t)$ into the conversion function $f_{conv}$. Therefore, according to the measurement method in the second embodiment, an amount of calculation for the measurement device 1 to estimate the displacement amplitude $w_{est}(t)$ is small, and it is possible to implement an increase in speed and a reduction in cost of the estimation processing.

According to the measurement method in the second embodiment, since the measurement device 1 uses the accelerometer 2 which has a higher degree of freedom of installation than the displacement meter 9 and a distortion gauge and can be easily installed in order to estimate the displacement amplitude $w_{est}(t)$, reduction in cost of the measurement system 10 is possible.

3. Modification

The present disclosure is not limited to the embodiments, and various modifications can be made within the scope of the gist of the present disclosure.

In each of the above embodiments, the measurement device 1 includes the conversion function calculation unit 141 and executes the conversion function calculation step S10. A device, which is not shown, different from the measurement device 1, or the monitoring device 3 may include the conversion function calculation unit 141 and perform the conversion function calculation step S10. In this case, the measurement device 1 may acquire the data on the coefficient value of the conversion function $f_{conv}$ from the device which is not shown or the monitoring device 3, store the acquired data in the storage unit 13 as the conversion function data 132, and then perform the acceleration data acquisition step S20 and the subsequent steps.

In each of the above embodiments, the conversion function $f_{conv}$ is described as a linear function, and the conversion function $f_{conv}$ may be a quadratic or higher function.

Figure 29:
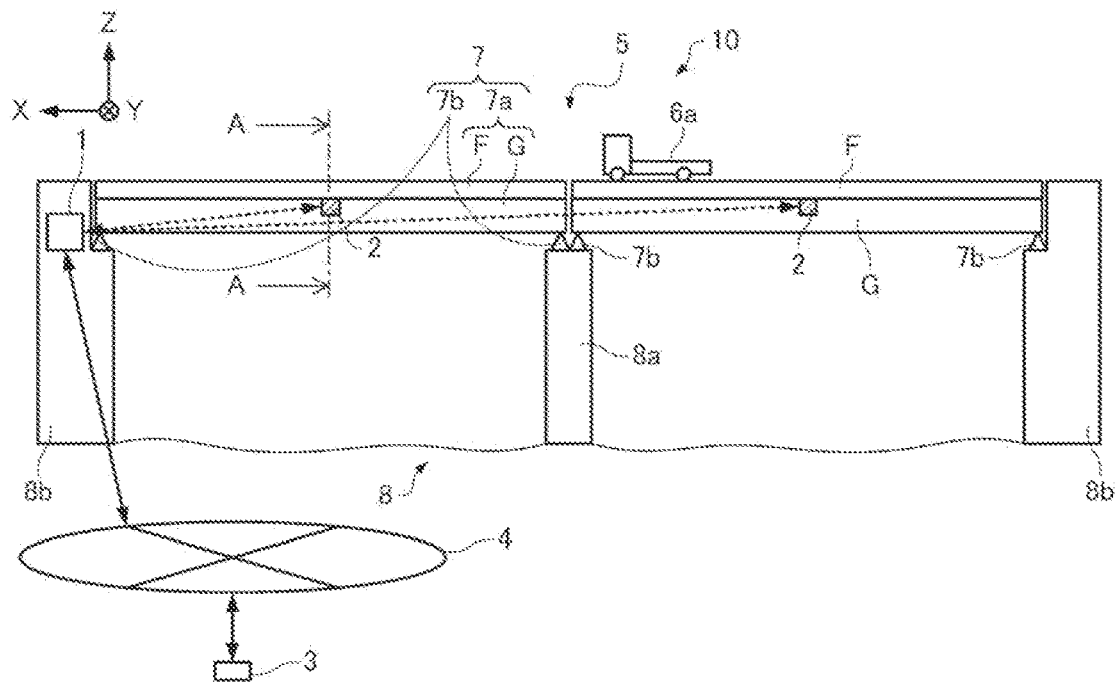
FIG. 29 is a diagram showing another configuration example of the measurement system.
Figure 30:
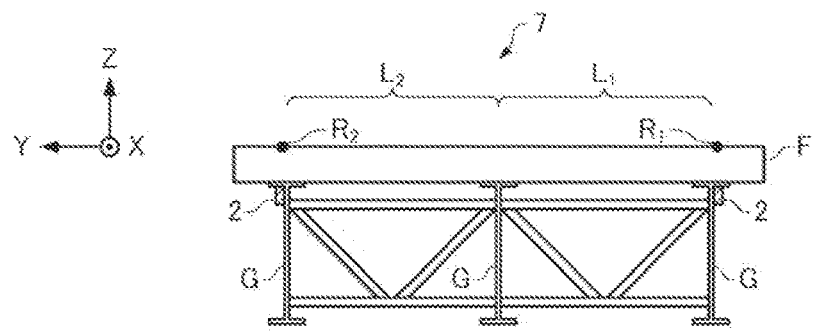
FIG. 30 is a cross-sectional view of a superstructure in FIG. 29 taken along line A-A.

In the above embodiments, the bridge 5 is a railway bridge, and the moving body moving on the bridge 5 is the railway vehicle 6. The bridge 5 may be a road bridge, and the moving body moving on the bridge 5 may be a vehicle such as an automobile, a road train, a truck, or a construction vehicle. FIG. 29 shows a configuration example of the measurement system 10 when the bridge 5 is a road bridge and a vehicle 6a moves on the bridge 5. In FIG. 29, the same components as those in FIG. 1 are denoted by the same reference numerals. As shown in FIG. 29, the bridge 5, which is a road bridge, includes the superstructure 7 and the substructure 8, similarly to the railway bridge. FIG. 30 is a cross-sectional view of the superstructure 7 taken along line A-A in FIG. 29. As shown in FIGS. 29 and 30, the superstructure 7 includes the bridge floor 7a including the floor plate F, the main girder G, and a cross girder which is not shown and the bearings 7b. As shown in FIG. 29, the substructure 8 includes the bridge piers 8a and the bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a. The bridge 5 is, for example, a steel bridge, a girder bridge, or an RC bridge.

Each accelerometer 2 is installed at a central portion of the superstructure 7 in a longitudinal direction, specifically, at a central portion of the main girder G in the longitudinal direction. However, each accelerometer 2 only needs to be able to detect an acceleration for calculating the displacement of the superstructure 7, and an installation position thereof is not limited to the central portion of the superstructure 7. When each accelerometer 2 is provided on the floor plate F of the superstructure 7, the accelerometer 2 may be damaged due to traveling of the vehicle 6a. Since the measurement accuracy may be affected by local deformation of the bridge floor 7a, in the examples of FIGS. 29 and 30, each accelerometer 2 is provided at the main girder G of the superstructure 7.

As shown in FIG. 30, the superstructure 7 has two lanes $L_1$ and $L_2$ on which the vehicle 6a as a moving body can move and three main girders G. In the example of FIGS. 29 and 30, in the central portion of the superstructure 7 in the longitudinal direction, the accelerometers 2 are respectively provided at two main girders at two ends, an observation point $R_1$ is provided at a position of a surface of the lane $L_1$ in a vertically upward direction of one of the accelerometers 2, and an observation point $R_2$ is provided at a position of a surface of the lane $L_2$ in the vertically upward direction of the other of the accelerometers 2. That is, the two accelerometers 2 are observation devices for observing the observation points $R_1$ and $R_2$, respectively. The two accelerometers 2 for respectively observing the observation points $R_1$ and $R_2$ may be provided at positions where accelerations generated at the observation points $R_1$ and $R_2$ due to the traveling of the vehicle 6a can be detected, and are preferably provided at positions close to the observation points $R_1$ and $R_2$. The number and installation positions of the accelerometers 2, and the number of the lanes are not limited to the example shown in FIGS. 29 and 30, and various modifications can be made.

The measurement device 1 estimates, based on the acceleration data output from the accelerometer 2 when the vehicle 6a passes through the superstructure 7 and the conversion function $f_{conv}$ calculated in advance, the displacement amplitude of the superstructure 7 when the vehicle 6a passes through the superstructure 7, specifically, the displacement amplitudes of the lanes $L_1$ and $L_2$. As described above, the conversion function $f_{conv}$ is calculated in advance based on the displacement data output from the displacement meter 9 that observes the observation point R. For example, the displacement meter 9 is installed before the accelerometer 2 is installed. The measurement device 1 calculates a conversion function based on the displacement data output from the displacement meter 9 when a vehicle 6b passes through the superstructure 7, and stores each coefficient of the calculated conversion function in a storage unit which is not shown. The vehicle 6b may be the same vehicle as the vehicle 6a or may be a vehicle different from the vehicle 6a. Then, after the displacement meter 9 is removed, the accelerometer 2 is installed in the superstructure 7. The measurement device 1 estimates, based on the acceleration data output from the accelerometer 2 when the vehicle 6a passes through the superstructure 7 and the conversion function stored in the storage unit, the displacement amplitude of the superstructure 7, specifically, the displacement amplitudes of the lanes $L_1$ and $L_2$.

The measurement device 1 transmits information on the estimated displacement amplitude of the superstructure 7 to the monitoring device 3 via the communication network 4. The monitoring device 3 may store the information in a storage device which is not shown, and may perform, based on the information, processing such as monitoring of the vehicle 6a or determination of an abnormality in the superstructure 7. Since the method of estimating the displacement amplitude of the superstructure 7 by the measurement device 1 is the same as that of any of the above embodiments, the detailed description thereof is omitted. The vehicle 6a is another example of the first moving body. The vehicle 6b is another example of the second moving body.

In the above embodiments, each accelerometer 2 is provided at the main girder G of the superstructure 7. The accelerometer 2 may be provided on the surface of or inside the superstructure 7, at the lower surface of the floor plate F, at the bridge pier 8a, or the like. In the above embodiments, the superstructure of the bridge is described as an example of the structure. The present disclosure is not limited thereto, and any structure may be used as long as the structure is deformed due to the movement of the moving body.

The above embodiments and modifications are merely examples, and the present disclosure is not limited thereto. For example, the embodiment and the modification can be combined as appropriate.

The present disclosure includes a configuration substantially the same as the configuration described in the embodiment, for example, a configuration having the same function, method and result, or a configuration having the same purpose and effect. The present disclosure includes a configuration obtained by replacing a non-essential portion of the configuration described in the embodiment. The present disclosure includes a configuration having the same functions and effects as the configurations described in the embodiments, or a configuration capable of achieving the same objects. The present disclosure includes a configuration in which a known technique is added to the configuration described in the embodiment.

The following contents are derived from the above embodiments and modifications.

A measurement method according to an aspect includes: an acceleration data acquisition step of acquiring acceleration data output from an accelerometer that observes an observation point of a structure when a first moving body moves on the structure; a speed vibration component calculation step of calculating a first speed vibration component by performing integration processing and filter processing on an acceleration based on the acceleration data; and a displacement amplitude estimation step of estimating, based on the first speed vibration component and a conversion function calculated in advance based on displacement data output from a displacement meter that observes the observation point when a second moving body moves on the structure, a displacement amplitude of the structure when the first moving body moves on the structure.

In the present measurement method, since the displacement meter directly measures the displacement of the structure, drift does not occur in the displacement based on the displacement data output from the displacement meter. Therefore, the conversion function calculated in advance based on the displacement data output from the displacement meter when the second moving body moves on the structure has relatively high conversion accuracy. In the present measurement method, since the first speed vibration component is calculated by performing the integration processing and the filter processing on data output from the accelerometer when the first moving body moves on the structure, the drift included in the first speed vibration component is reduced by the filter processing. In the present measurement method, the displacement amplitude of the structure when the first moving body moves on the structure is estimated based on the first speed vibration component and the conversion function. Therefore, the influence of a significant drift caused by twice integrating the acceleration based on the acceleration data does not occur. Therefore, according to the present measurement method, it is possible to accurately estimate the displacement amplitude of the structure when the first moving body moves on the structure.

According to the present measurement method, since the influence of the significant drift due to twice integrating the acceleration does not occur, the drift correction processing is not required, and the simpler displacement amplitude is estimated instead of the displacement waveform of the structure when the first moving body moves on the structure. Therefore, an amount of calculation for estimation is small, and it is possible to implement an increase in speed and a reduction in cost of estimation processing.

According to the present measurement method, in order to estimate the displacement amplitude of the structure when the first moving body moves on the structure, an accelerometer which has a higher degree of freedom of installation than a displacement meter or a distortion gauge and can be easily installed is used, and thus the reduction in cost is possible.

In the measurement method according to the above aspect, the displacement amplitude estimation step may include calculating an amplitude of the first speed vibration component, and calculating the displacement amplitude of the structure by substituting the amplitude of the first speed vibration component into the conversion function.

According to the present measurement method, the displacement amplitude of the structure when the first moving body moves on the structure can be estimated by processing with a small amount of calculation of calculating the first speed vibration component by performing the integration processing and the filter processing on the acceleration based on the acceleration data and by substituting the amplitude of the first speed vibration component into the conversion function calculated in advance.

In the measurement method according to the above aspect, the amplitude of the first speed vibration component may be a difference between a maximum value and a minimum value of the first speed vibration component.

According to the present measurement method, the amplitude of the first speed vibration component can be calculated with a small amount of calculation by extracting the maximum value and the minimum value of the first speed vibration component and calculating the difference therebetween.

The measurement method according to the above aspect may further include: a conversion function calculation step of calculating the conversion function. The conversion function calculation step includes acquiring the displacement data, calculating a second speed vibration component by performing differential processing and the filter processing on a displacement based on the displacement data, and calculating, as the conversion function, a function representing a relationship between the displacement amplitude based on the displacement data and an amplitude of the second speed vibration component.

In the present measurement method, since the function representing the relationship between the displacement amplitude measured with high accuracy by the displacement meter and the amplitude of the second speed vibration component with high accuracy obtained by performing the differential processing and the filter processing on the displacement is calculated as the conversion function, the conversion function with high accuracy can be obtained. Therefore, according to the present measurement method, it is possible to accurately estimate the displacement amplitude of the structure when the first moving body moves on the structure based on the conversion function with high accuracy.

In the measurement method according to the above aspect, the displacement amplitude based on the displacement data may be a difference between a maximum value and a minimum value of the displacement, and the amplitude of the second speed vibration component may be a difference between a maximum value and a minimum value of the second speed vibration component.

According to the present measurement method, the displacement amplitude and the amplitude of the second speed vibration component can be calculated with a small amount of calculation by extracting the maximum value and the minimum value of the displacement and calculating the difference therebetween, and extracting the maximum value and the minimum value of the second speed vibration component and calculating the difference therebetween. According to the present measurement method, the conversion function with high accuracy can be calculated by using a maximum amplitude having a high S/N as both the displacement amplitude and the amplitude of the second speed vibration component.

In the measurement method according to the above aspect, the displacement amplitude estimation step may include calculating the displacement amplitude by substituting the first speed vibration component into the conversion function.

According to the present measurement method, the displacement amplitude of the structure when the first moving body moves on the structure can be estimated by processing with a small amount of calculation of substituting the first speed vibration component obtained by performing the integration processing and the filter processing on the acceleration based on the acceleration data into the conversion function calculated in advance.

The measurement method according to the above aspect may further include: a conversion function calculation step of calculating the conversion function. The conversion function calculation step includes acquiring the displacement data, calculating a displacement vibration component by performing the filter processing on a displacement based on the displacement data, calculating a first envelope by performing low-pass filter processing on an absolute value of the displacement vibration component, calculating the displacement amplitude of the structure when the second moving body moves on the structure by subtracting the first envelope from the displacement obtained by performing the low-pass filter processing on the displacement based on the displacement data, calculating a second speed vibration component by performing differential processing and the filter processing on the displacement based on the displacement data, calculating a second envelope by performing the low-pass filter processing on an absolute value of the second speed vibration component, and calculating, as the conversion function, a function representing a relationship between the displacement amplitude of the structure and the second envelope.

In the present measurement method, the first envelope which is an envelope of a displacement vibration component and a second envelope which is an envelope of a speed vibration component are calculated based on the displacement measured by the displacement meter, and a conversion function is calculated based on the first envelope and the second envelope. Therefore, according to the present measurement method, it is possible to calculate the conversion function with higher accuracy in which the fluctuation included in the displacement measured by the displacement meter and the influence of noise are reduced, and thus it is possible to accurately estimate the displacement amplitude of the structure when the first moving body moves on the structure.

In the measurement method according to the above aspect, the displacement meter may be a ring type displacement meter, a laser displacement meter, an image measurement device, or a load cell.

In the measurement method according to the above aspect, the structure may be a superstructure of a bridge.

According to the present measurement method, it is possible to accurately calculate the displacement amplitude of the superstructure when the first moving body moves on the superstructure of the bridge by the processing with a small amount of calculation.

In the measurement method according to the above aspect, the first moving body may be a vehicle or a railway vehicle.

According to the present measurement method, it is possible to accurately calculate the displacement amplitude of the structure when the vehicle or the railway vehicle moves on the structure by processing with a small amount of calculation.

In the measurement method according to the above aspect, the structure may be a structure in which bridge weigh in motion (BWIM) functions.

A measurement device according to an aspect includes: an acceleration data acquisition unit configured to acquire acceleration data output from an accelerometer that observes an observation point of a structure when a first moving body moves on the structure; a speed vibration component calculation unit configured to calculate a first speed vibration component by performing integration processing and filter processing on an acceleration based on the acceleration data; and a displacement amplitude estimation unit configured to estimate, based on the first speed vibration component and a conversion function calculated in advance based on displacement data output from a displacement meter that observes the observation point when a second moving body moves on the structure, a displacement amplitude of the structure when the first moving body moves on the structure.

In the present measurement device, since the displacement meter directly measures the displacement of the structure, drift does not occur in the displacement based on the displacement data output from the displacement meter. Therefore, the conversion function calculated in advance based on the displacement data output from the displacement meter when the second moving body moves on the structure has relatively high conversion accuracy. In the present measurement device, since the first speed vibration component is calculated by performing the integration processing and the filter processing on data output from the accelerometer when the first moving body moves on the structure, the drift included in the first speed vibration component is reduced by the filter processing. In the present measurement device, the displacement amplitude of the structure when the first moving body moves on the structure is estimated based on the first speed vibration component and the conversion function. Therefore, the influence of a significant drift caused by twice integrating the acceleration based on the acceleration data does not occur. Therefore, according to the present measurement device, it is possible to accurately estimate the displacement amplitude of the structure when the first moving body moves on the structure.

According to the present measurement device, since the influence of the significant drift due to twice integrating the acceleration does not occur, the drift correction processing is not required, and the simpler displacement amplitude is estimated instead of the displacement waveform of the structure when the first moving body moves on the structure. Therefore, an amount of calculation for estimation is small, and it is possible to implement an increase in speed and a reduction in cost of estimation processing.

According to the present measurement device, in order to estimate the displacement amplitude of the structure when the first moving body moves on the structure, an accelerometer which has a higher degree of freedom of installation than a displacement meter or a distortion gauge and can be easily installed is used, and thus the reduction in cost is possible.

A measurement system according to an aspect includes: the measurement device according to the above aspect; and the accelerometer.

According to an aspect of the present disclosure, a non-transitory computer-readable storage medium stores a measurement program, the measurement program causing a computer to execute: an acceleration data acquisition step of acquiring acceleration data output from an accelerometer that observes an observation point of a structure when a first moving body moves on the structure; a speed vibration component calculation step of calculating a first speed vibration component by performing integration processing and filter processing on an acceleration based on the acceleration data; and a displacement amplitude estimation step of estimating, based on the first speed vibration component and a conversion function calculated in advance based on displacement data output from a displacement meter that observes the observation point when a second moving body moves on the structure, a displacement amplitude of the structure when the first moving body moves on the structure.

In the present measurement program, since the displacement meter directly measures the displacement of the structure, drift does not occur in the displacement based on the displacement data output from the displacement meter. Therefore, the conversion function calculated in advance based on the displacement data output from the displacement meter when the second moving body moves on the structure has relatively high conversion accuracy. In the present measurement program, since the first speed vibration component is calculated by performing the integration processing and the filter processing on data output from the accelerometer when the first moving body moves on the structure, the drift included in the first speed vibration component is reduced by the filter processing. In the present measurement program, the displacement amplitude of the structure when the first moving body moves on the structure is estimated based on the first speed vibration component and the conversion function. Therefore, the influence of a significant drift caused by twice integrating the acceleration based on the acceleration data does not occur. Therefore, according to the present measurement program, it is possible to accurately estimate the displacement amplitude of the structure when the first moving body moves on the structure.

According to the present measurement program, since the influence of the significant drift due to twice integrating the acceleration does not occur, the drift correction processing is not required, and the simpler displacement amplitude is estimated instead of the displacement waveform of the structure when the first moving body moves on the structure. Therefore, an amount of calculation for estimation is small, and it is possible to implement an increase in speed and a reduction in cost of estimation processing.

According to the present measurement program, in order to estimate the displacement amplitude of the structure when the first moving body moves on the structure, an accelerometer which has a higher degree of freedom of installation than a displacement meter or a distortion gauge and can be easily installed is used, and thus the reduction in cost is possible.

What is claimed is:

1. A measurement method for causing a processor to execute a program stored in a memory, the measurement method comprising executing on the processor the steps of:
    acquiring acceleration data output from an accelerometer that observes an observation point of a superstructure of a bridge when a first vehicle moves on the superstructure, the accelerometer being disposed at the superstructure;
    integrating an acceleration of the acceleration data to obtain an integral speed;
    calculating a first speed vibration component by performing high-pass filter processing on the integral speed, the first speed vibration component including a first maximum value and a first minimum value;
    calculating a first speed amplitude corresponding to a difference between the first maximum and minimum values of the first speed vibration component;
    acquiring displacement data output from a displacement meter that observes the observation point when a second vehicle moves on the superstructure, the displacement meter being disposed at the superstructure, the displacement data including a displacement value of the superstructure along a vertical direction, the displacement value including a second maximum value and a second minimum value;
    differentiating the displacement value to obtain a speed of the second vehicle;
    calculating a second speed vibration component by performing high-pass filter processing on the speed, the second speed vibration component including a third maximum value and a third minimum value;
    calculating a first displacement amplitude corresponding to a difference between the second maximum and minimum values of the displacement value;
    calculating a second speed amplitude corresponding to a difference between the third maximum and minimum values of the second speed vibration component;
    calculating a conversion function using the first displacement amplitude and the second speed amplitude;
    estimating a second displacement amplitude of the superstructure based on the first speed amplitude and the conversion function when the first vehicle moves on the superstructure; and
    determining an abnormality of the superstructure based on the estimated second displacement amplitude of the superstructure.

2. The measurement method according to claim 1, wherein
    the displacement meter is a ring type displacement meter, a laser displacement meter, an image measurement device, or a load cell.

3. The measurement method according to claim 1, wherein
    the first vehicle is a railway vehicle.

4. The measurement method according to claim 1, wherein
    the superstructure is a structure in which bridge weigh in motion (BWIM) functions.

5. A measurement device comprising:
    a memory configured to store a program; and
    a processor configured to execute the program so as to:
        acquire acceleration data output from an accelerometer that observes an observation point of a superstructure of a bridge when a first vehicle moves on the superstructure, the accelerometer being disposed at the superstructure;
integrate an acceleration of the acceleration data to obtain an integral speed;
calculate a first speed vibration component by performing high-pass filter processing on the integral speed, the first speed vibration component including a first maximum value and a first minimum value;
calculate a first speed amplitude corresponding to a difference between the first maximum and minimum values of the first speed vibration component;
acquire displacement data output from a displacement meter that observes the observation point when a second vehicle moves on the superstructure, the displacement meter being disposed at the superstructure, the displacement data including a displacement value of the superstructure along a vertical direction, the displacement value including a second maximum value and a second minimum value;
differentiate the displacement value to obtain a speed of the second vehicle;
calculate a second speed vibration component by performing high-pass filter processing on the speed, the second speed vibration component including a third maximum value and a third minimum value;
calculate a first displacement amplitude corresponding to a difference between the second maximum and minimum values of the displacement value;
calculate a second speed amplitude corresponding to a difference between the third maximum and minimum values of the second speed vibration component;
calculate a conversion function using the first displacement amplitude and the second speed amplitude;
estimate a second displacement amplitude of the superstructure based on the first speed amplitude and the conversion function when the first vehicle moves on the superstructure; and
determine an abnormality of the superstructure based on the estimated second displacement amplitude of the superstructure.

6. A measurement system comprising:
the measurement device according to claim 5; and
the accelerometer.

7. A non-transitory computer-readable storage medium storing a measurement program for causing a computer to execute a process by a processor so as to perform the steps of:
acquiring acceleration data output from an accelerometer that observes an observation point of a superstructure of a bridge when a first vehicle moves on the superstructure, the accelerometer being disposed at the superstructure;
integrating an acceleration of the acceleration data to obtain an integral speed;
calculating a first speed vibration component by performing high-pass filter processing on the integral speed, the first speed vibration component including a first maximum value and a first minimum value;
calculating a first speed amplitude corresponding to a difference between the first maximum and minimum values of the first speed vibration component;
acquiring displacement data output from a displacement meter that observes the observation point when a second vehicle moves on the superstructure, the displacement meter being disposed at the superstructure, the displacement data including a displacement value of the superstructure along a vertical direction, the displacement value including a second maximum value and a second minimum value;
differentiating the displacement value to obtain a speed of the second vehicle;
calculating a second speed vibration component by performing high-pass filter processing on the speed, the second speed vibration component including a third maximum value and a third minimum value;
calculating a first displacement amplitude corresponding to a difference between the second maximum and minimum values of the displacement value;
calculating a second speed amplitude corresponding to a difference between the third maximum and minimum values of the second speed vibration component;
calculating a conversion function using the first displacement amplitude and the second speed amplitude;
estimating a second displacement amplitude of the superstructure based on the first speed amplitude and the conversion function when the first vehicle moves on the superstructure; and
determining an abnormality of the superstructure based on the estimated second displacement amplitude of the superstructure.

\* \* \* \* \*